United States Patent
Wu et al.

(10) Patent No.: US 11,890,707 B2
(45) Date of Patent: Feb. 6, 2024

(54) DEVICE ASSEMBLING SYSTEM, METHOD, AND APPARATUS

(71) Applicants: HUAWEI TECHNOLOGIES CO., LTD., Shenzhen (CN); NANJING ENIGMA AUTOMATION CO., LTD., Nanjing (CN)

(72) Inventors: Di Wu, Hangzhou (CN); Yuan Cheng, Nanjing (CN); Xian Zhang, Hangzhou (CN); Hongda Li, Nanjing (CN)

(73) Assignees: Huawei Technologies Co., Ltd., Shenzhen (CN); NANJING ENIGMA AUTOMATION CO., LTD., Nanjing (CN)

( * ) Notice: Subject to any disclaimer, the term of this patent is extended or adjusted under 35 U.S.C. 154(b) by 0 days.

(21) Appl. No.: 18/151,276

(22) Filed: Jan. 6, 2023

(65) Prior Publication Data

US 2023/0150075 A1    May 18, 2023

Related U.S. Application Data

(63) Continuation of application No. PCT/CN2021/099528, filed on Jun. 10, 2021.

(30) Foreign Application Priority Data

Jul. 8, 2020    (CN) .......................... 202010653135.3

(51) Int. Cl.
   *B23P 19/04*    (2006.01)
   *B25J 9/16*    (2006.01)
(52) U.S. Cl.
   CPC ............. *B23P 19/04* (2013.01); *B25J 9/1687* (2013.01)

(58) Field of Classification Search
   CPC ......... B23P 19/04; B23P 19/001; B23P 19/00; B25J 9/1687; B25J 9/1682;
   (Continued)

(56) References Cited

U.S. PATENT DOCUMENTS 9,908,239 B1 * 3/2018 O'Brien .................... B25J 9/02
10,398,055 B1    8/2019 Tandon et al.
(Continued)

FOREIGN PATENT DOCUMENTS

CN    101890638 A    11/2010
CN    103128731 A *  6/2013
(Continued)

OTHER PUBLICATIONS

Xinhong Chen; Intelligent assembling method and production line system; Dec. 29, 2014; EPO English Machine Translation ; pp. 1-7. (Year: 2023).*

*Primary Examiner* — Bayan Salone
(74) *Attorney, Agent, or Firm* — Leydig. Voit & Mayer, Ltd.

(57) ABSTRACT

A device assembling system includes a management apparatus, a material apparatus, and an execution apparatus. The management apparatus is communicatively connected to the material apparatus and the execution apparatus, and the material apparatus and the execution apparatus are installed into an overall structure. The management apparatus is configured to obtain a maintenance task of a maintenance device. The maintenance task includes an operation type and an operation object. The management apparatus parses the maintenance task into a first control instruction and a second control instruction. The material apparatus receives the first control instruction, and searches for a to-be-assembled part according to the first control instruction, that is, the material apparatus may determine a position of the to-be-assembled part. The execution apparatus receives the second control (Continued)

instruction, and obtains the to-be-assembled part and assembles the to-be-assembled part to a device according to the second control instruction.

17 Claims, 11 Drawing Sheets

(58) Field of Classification Search
CPC ........... G05B 2219/36195; G05B 2219/40033; G05B 2219/40059; G05B 2219/45045; G05B 19/418; G05B 19/41805; G06F 16/1767; G06F 16/1815; Y02P 90/02
See application file for complete search history.

(56) References Cited

U.S. PATENT DOCUMENTS

| | | | |
|---|---|---|---|
| 11,415,967 B2 * | 8/2022 | Gentile | ................. F25D 23/066 |
| 2013/0004289 A1 * | 1/2013 | Gaudette | ............. B65G 47/904 410/121 |

FOREIGN PATENT DOCUMENTS

| | | | | | |
|---|---|---|---|---|---|
| CN | 103128731 | A | | 6/2013 | |
| CN | 104690551 | A | | 6/2015 | |
| CN | 104690551 | A | * | 6/2015 | ............. B23P 21/00 |
| CN | 105883280 | A | * | 8/2016 | |
| CN | 106112330 | A | | 11/2016 | |
| CN | 106112330 | A | * | 11/2016 | |
| CN | 106475773 | A | | 3/2017 | |
| CN | 106475773 | A | * | 3/2017 | ............. B23P 19/04 |
| CN | 106853639 | A | | 6/2017 | |
| CN | 106853639 | A | * | 6/2017 | |
| CN | 108415280 | A | * | 8/2018 | |
| CN | 108994602 | A | | 12/2018 | |
| CN | 108994602 | A | * | 12/2018 | |
| CN | 109397285 | A | * | 3/2019 | ............. B23P 19/00 |
| CN | 110221586 | A | * | 9/2019 | |
| CN | 110221586 | A | | 9/2019 | |
| CN | 111240281 | A | | 6/2020 | |
| EP | 4169664 | A1 | * | 4/2023 | ............. B23P 19/04 |
| JP | H09267276 | A | * | 3/1996 | |
| JP | H09267276 | A | | 10/1997 | |
| JP | 2008203922 | A | | 9/2008 | |
| JP | 2008203922 | A | * | 9/2008 | |
| WO | WO-2019025003 | A1 | * | 2/2019 | ........... F25D 23/066 |

* cited by examiner

DEVICE ASSEMBLING SYSTEM, METHOD, AND APPARATUS

CROSS-REFERENCE TO RELATED APPLICATIONS

This application is a continuation of International Application No. PCT/CN2021/099528, filed on Jun. 10, 2021, which claims priority to Chinese Patent Application No. 202010653135.3, filed on Jul. 8, 2020. The disclosures of the aforementioned applications are hereby incorporated by reference in their entireties.

TECHNICAL FIELD

This application relates to the field of data center technologies, and in particular, to a device assembling system, method, and apparatus.

BACKGROUND

A server is used as a key part of a data center, and hardware maintenance of the server is also an important portion of maintenance work of the data center. Server hardware is mainly maintained in the following scenarios: fault maintenance, part change and expansion, part recovery of a scrapped server, and the like. All the maintenance work requires manual removal and installation operations on parts of a server. Therefore, an entire process has complex steps, is time-consuming and laborious, and has a specific requirement for a technical level of an operator. In addition, during a manual operation, an error may occur in updating asset information such as serial numbers (SN) or to-be-replaced bills of material (BOM) of a part and a server. Therefore, how to provide a method for automatically assembling a device becomes a technical problem to be urgently resolved.

SUMMARY

This application provides a device assembling system, method, and apparatus, to implement automatic assembling of a device to replace a manual operation, thereby helping improve efficiency. In addition, log information, installed-part information, and the like may be automatically updated, to ensure real-time updating and accuracy of part information of the device.

According to a first aspect, this application provides a device assembling system. The system includes a management apparatus, a material apparatus, and an execution apparatus, the management apparatus is communicatively connected to the material apparatus and the execution apparatus, and the material apparatus and the execution apparatus are installed into an integral structure. The management apparatus is configured to obtain a maintenance task of a maintenance device, where the maintenance task includes an operation type and an operation object, and the management apparatus may further parse the maintenance task into a first control instruction and a second control instruction based on the operation type and the operation object. The material apparatus is configured to place a to-be-assembled part, and the material apparatus receives the first control instruction generated by the management apparatus, and searches for the to-be-assembled part according to the first control instruction, that is, the material apparatus may determine a position of the to-be-assembled part. The execution apparatus receives the second control instruction of the management apparatus, and obtains the to-be-assembled part and assembles the to-be-assembled part to a device according to the second control instruction, to implement an automatic assembling process of the device.

Optionally, the material apparatus and the execution apparatus may further feed back feedback information such as operation logs and material information to the management apparatus.

The device assembling system provided in this application may automatically assemble the device, to replace a manual operation. On one hand, an assembling effect can be improved. On the other hand, log information and installed-part information may be updated in a timely manner by using communication connections between the management apparatus and the material apparatus and the execution apparatus, so that both information updating timeliness and information updating accuracy can be ensured, thereby overcoming a problem that a subjective error is caused by human participation.

In a possible implementation, the material apparatus and the execution apparatus are assembled into an integral structure, to facilitate maintenance and transportation of the device assembling system, and also facilitate material transmission between the material apparatus and the execution apparatus. There are a plurality of specific solutions for assembling the material apparatus and the execution apparatus into an integral structure. For example, the material apparatus and the execution apparatus may be welded into an integral structure; the material apparatus and the execution apparatus may be installed on a same base, to implement an integral structure of the material apparatus and the execution apparatus by using the base; or the material apparatus and the execution apparatus may be connected in a detachable connection manner, for example, by using a bolt, so that the material apparatus and the execution apparatus are assembled into an integral structure.

In a possible implementation, to facilitate moving of the device assembling system, the system further includes a movable apparatus, and the movable apparatus is installed at bottom portions of the material apparatus and the execution apparatus. The movable apparatus may be a simple castor, and the system is pushed manually or in cooperation with an external machine to move; or a drive structure may be configured for the movable apparatus, so that the drive structure can directly drive the system to move. When the device assembling system needs to move, for example, in a working process, the system needs to move to the vicinity of a to-be-assembled device, or needs to move from one working scenario to another working scenario, configuration of the movable apparatus reduces moving difficulty of the system, so that an application scenario of the system can be enriched.

In another possible implementation, the maintenance task includes the operation type and the operation object. The operation type may include part installation, part replacement, or part removal. That is, the system in this application may be applied to any scenario, such as installation, removal, or replacement, in a device assembling process, so that an application scope is relatively wide. The operation object may include a number of a to-be-adjusted device, a model of a to-be-removed part, a model of a to-be-assembled part, or the like. The management apparatus may generate a task flow based on the foregoing information to generate the first control instruction and the second control instruction, to instruct the material apparatus and the execution apparatus to complete the maintenance task in an orderly manner.

In another possible implementation, the material apparatus specifically includes a first controller, a shelf, a material table, and a transport component. The first controller is communicatively connected to the management apparatus, the shelf is configured to place the to-be-assembled part, and the transport component is configured to transport the to-be-assembled part in the shelf to the material table. The first controller is configured to determine a position of the to-be-assembled part in the shelf according to the first control instruction, and is further configured to control the transport component to transport the to-be-assembled part from the shelf to the material table, so that the execution apparatus obtains the to-be-assembled part from the material table.

In another possible implementation, the execution apparatus includes a second controller and a robot media handler. The second controller is communicatively connected to the management apparatus to receive the second control instruction. The second controller is configured to control, according to the second control instruction, the robot media handler to grip the to-be-assembled part located on the material table of the material apparatus and assemble the to-be-assembled part to the device.

Because a quantity of to-be-assembled parts placed in the shelf is limited, the shelf needs to be replenished with a part in a warehouse, and a temporarily-unnecessary material in the shelf needs to be stored in the warehouse. The material apparatus further includes a material inlet table and a material outlet table, and the material inlet table and the material outlet table are interconnected to the warehouse for material transmission, to implement material flowing between the shelf and the warehouse.

In another possible implementation, to accommodate the to-be-assembled part, the shelf includes a plurality of slots, and a material is accommodated in the slot, so that the material apparatus can determine a specific slot through positioning when determining the position of the to-be-assembled part. In addition, to facilitate the transport component in taking out the material from the slot, a positioning structure is further disposed in each slot, and the positioning structure is adapted to the transport component, so that the transport component accurately grips a material in the slot based on the positioning structure. In a specific technical solution, the positioning structure may be a guide surface, and the transport component can accurately grip the material under a guiding action of the guide surface.

In another possible implementation, the material apparatus further includes a material tray that can accommodate a material, and the material tray can be accommodated in the slot in the shelf. On one hand, the material tray can protect the material from being prone to be damaged. On the other hand, the material tray is further conducive to normalization of the slots in the shelf and normalization of the transport component. Specifically, an internal structure of the material tray may be enabled to match the material, and an external structure of the material tray is normalized, that is, corresponding to different materials, the material tray has a same external structure. Therefore, there is no need to design different structures for the slot that cooperates with an external portion of the material tray and the transport component, and normalization can also be implemented.

In another possible implementation, to carry a part removed from a device, the material apparatus further includes a material transfer table, and the robot media handler places the removed part on the material transfer table or a scrap area based on control of the second controller. Specifically, when the part removed by the robot media handler needs to be reused, the robot media handler places the removed part on the material transfer table, and the transport component of the material apparatus transports the removed part from the material transfer table to the shelf based on control of the first controller, to facilitate reuse of the removed part. When the part removed by the robot media handler needs to be scrapped, the robot media handler may directly place the removed part in the scrap area. Optionally, the removed part may be placed at another position. This is not limited in this application.

In another possible implementation, to improve reliability of the device assembling system, the execution apparatus further includes a recognizer, configured to scan an identifier of a material to obtain information about the current scanned material. The recognizer is communicatively connected to the second controller, so that the second controller obtains the information obtained by the recognizer. After the second controller performs comparison and matching on the material information obtained by the recognizer and information about the operation object in the maintenance task, the execution apparatus performs a next action. If the execution apparatus is assembling a part, after information matching, the second controller controls the robot media handler to install the part to a device. If the execution apparatus is removing a part, after information matching, the second controller controls the robot media handler to place the part in the material apparatus.

In another possible implementation, to adapt to parts of different structures, in a possible technical solution, the robot media handler includes a robot arm and a tool handler component, the tool handler component includes a plurality of tool handlers, the tool handler component is communicatively connected to the second controller, and the tool handler component may adjust a position based on control of the second controller to enable a tool handler that needs to be used to be located at a working position of the robot arm.

In another possible implementation, the robot media handler includes a robot arm and tool handlers, and the tool handlers are detachably connected to the robot arm by using quick structures. The execution apparatus includes a tool handler storage rack, the tool handlers are placed in the tool handler storage rack, and the robot arm may move to the tool handler storage rack, to be connected, by using the quick structure, to a tool handler that needs to be used. In this solution, the robot arm is installed to one tool handler each time, so that a structure is relatively simple and is not prone to interfere with another structure. Therefore, the robot media handler has relatively large moving space.

In another possible implementation, to further improve efficiency of the robot media handler and reduce a quantity of tool handler replacement times, each tool handler may further include at least two grippers, and each gripper corresponds to one specific operation. Therefore, when changing an operation, the robot media handler may adjust a posture of the robot media handler to adjust from a working state of one gripper to a working state of another gripper, without replacing a tool handler.

In another possible implementation, to improve operation accuracy of the robot media handler, the robot media handler further includes a positioning component. The positioning component is also communicatively connected to the second controller, and the positioning component may determine, through positioning, coordinates of an area to be operated by the robot media handler, so that the robot media handler accurately operates the to-be-operated area.

In another possible implementation, to improve a part and device protection effect of the device assembling system, the robot media handler further includes a mechanical sensor. The mechanical sensor is also communicatively connected to the second controller. In a process in which the robot media handler moves, if the robot media handler encounters an obstacle, the mechanical sensor may detect a force value. When a force value fed back by the mechanical sensor reaches a specified threshold, it is considered that the robot media handler encounters an obstacle, and a part or the obstacle may be damaged if the robot media handler continues to move. The obstacle may be a device, or may be a structure of the device assembling system. Therefore, the second controller controls the robot media handler to stop acting, to prevent the robot media handler from hitting the obstacle, thereby protecting the part and the device.

In another possible implementation, the material apparatus is further configured to place a part removed from a device during part replacement or part recovery.

In another possible implementation, the material apparatus is further configured to: when a specific condition is met, adjust a position of a to-be-assembled part in a slot in the shelf, or adjust a type of a to-be-assembled part placed in a slot. Specifically, based on use frequencies of different types of to-be-assembled parts, a to-be-assembled part of a type with a relatively high use frequency may be placed in a slot from which a part is relatively easy to be gripped. For example, for a use frequency of a to-be-assembled part of a type, if a quantity of times of obtaining the to-be-assembled part of the type in a first time period meets a first threshold, it is considered that the use frequency of the to-be-assembled part of the type is relatively high, and the to-be-assembled part of the type is adjusted to a slot from which a material is relatively easy to be transported.

According to a second aspect, this application further provides a device assembling method. The method includes the following steps:

A management apparatus receives a maintenance task, where the maintenance task includes an operation type and an operation object;

the management apparatus parses the maintenance task into a first control instruction and a second control instruction based on the operation type and the operation object; and the management apparatus separately sends the first control instruction and the second control instruction to a material apparatus and an execution apparatus, to instruct the material apparatus and the execution apparatus to complete an assembling operation of a to-be-assembled part in a device.

In this solution, a device assembling system is used to assemble a part of a server. First, the management apparatus obtains the maintenance task, determines the operation type and the operation object, and generates the first control instruction and the second control instruction. The material apparatus prepares, according to the first control instruction, the to-be-assembled part required for server assembling, and a robot media handler of the execution apparatus assembles, according to the second control instruction, the to-be-assembled part prepared by the material apparatus to the server. Therefore, automatic assembling of the server can be implemented to replace a manual operation, thereby helping improve efficiency. In addition, assembling log information, installed-part information, and the like may be uploaded to the management apparatus through communication between a first controller and a second controller and the management apparatus, to ensure real-time updating and accuracy of material information of the server.

In a possible implementation, the operation type in the maintenance task includes part installation, part replacement, or part removal, that is, any operation required for device maintenance can be implemented by using the method. The operation object includes a number of a to-be-adjusted device, a model of a to-be-removed part, or a model of a to-be-assembled part. Therefore, the management apparatus can generate the first control instruction and the second control instruction based on the user operation type and the operation object.

In another possible implementation, the maintenance task further includes a task type. The task type specifically includes a scheduled task, an automatic task, and a manual task. The scheduled task is a task that starts to be executed when an execution time point reaches, the automatic task is an immediately-executed task, and the manual task is a task executed after an operation and maintenance person performs manual determining.

In another possible implementation, when the operation type is part installation, the material apparatus searches for a to-be-assembled part according to the first control instruction; and the execution apparatus installs the to-be-assembled part to a device according to the second control instruction. Specifically, the execution apparatus may obtain the to-be-assembled part from the material apparatus, and then install the to-be-assembled part to the device.

In another possible implementation, when the operation type is part removal, the execution apparatus determines a position of a to-be-removed part and removes the to-be-removed part according to the second control instruction, and obtains a code of the to-be-removed part; and the material apparatus transports the to-be-removed part to an accommodation area according to the first control instruction, and records a position and the code of the to-be-removed part. The accommodation area may be a vacant slot in a shelf.

In another possible implementation, when the operation type is part replacement, the execution apparatus determines a position of a to-be-removed part and removes the to-be-removed part according to the second control instruction; the material apparatus searches for a to-be-assembled part according to the first control instruction; and the execution apparatus installs the to-be-assembled part to a device according to the second control instruction.

In another possible implementation, a specific form in which the management apparatus separately sends the first control instruction and the second control instruction to the material apparatus and the execution apparatus is not limited. The management apparatus may send the first control instruction and the second control instruction to the material apparatus, and the material apparatus may process the second control instruction to generate a new second control instruction and then send the new second control instruction to the execution apparatus, to reduce communication between the management apparatus and the second controller. Alternatively, the management apparatus may directly send the second control instruction to the execution apparatus. This is not specifically limited in this application.

In another possible implementation, the material apparatus is further configured to: when a specific condition is met, adjust a position of a to-be-assembled part in a slot in the shelf, or adjust a type of a to-be-assembled part placed in a slot. Specifically, based on use frequencies of different types of to-be-assembled parts, a to-be-assembled part of a type with a relatively high use frequency may be placed in a slot from which a part is relatively easy to be gripped. For example, for a use frequency of a to-be-assembled part of a type, if a quantity of times of obtaining the to-be-assembled part of the type in a first time period meets a first threshold, it is considered that the use frequency of the to-be-assembled part of the type is relatively high, and the to-be-assembled part of the type is adjusted to a slot from which a material is relatively easy to be transported.

According to a third aspect, this application further provides a device assembling apparatus. The apparatus includes modules configured to perform the device assembling method in any one of the second aspect or the possible implementations of the second aspect.

According to a fourth aspect, this application provides a management apparatus. The management apparatus includes a processor, a memory, a communications interface, and a bus. The processor, the memory, and the communications interface are connected and communicate with each other by using the bus. The memory is configured to store computer executable instructions. When the management apparatus runs, the processor executes the computer executable instructions in the memory, to perform the operation steps of the method in any one of the second aspect or the possible implementations of the second aspect by using a hardware resource in the management apparatus.

According to a fifth aspect, this application provides a computer-readable storage medium. The computer-readable storage medium stores instructions. When the instructions are run on a computer, the computer is enabled to perform the method in the foregoing aspects.

According to a sixth aspect, this application provides a computer program product that includes instructions. When the computer program product is run on a computer, the computer is enabled to perform the method in the foregoing aspects.

The device assembling apparatus in this application is used to assemble a part of a device, to implement automatic assembling of the device to replace a manual operation, thereby helping improve efficiency. In addition, assembling log information, material information, and the like may be uploaded to the management apparatus through communication between the first controller and the second controller and the management apparatus, to ensure real-time updating and accuracy of material information of the device.

In this application, the implementations provided in the foregoing aspects can be further combined to provide more implementations.

REFERENCE SIGNS

100—Material apparatus;
110—Shelf;
120—Material table;
130—Transport component;
131—Shuttle;
140—Material transfer table;
150—Material tray;
151—Protrusion;
152—Clamping position;
160—Material inlet table;
170—Material outlet table;
180—First controller;
200—Execution apparatus;
210—Operating table;
220—Robot media handler;
221—Robot arm;
222—Tool handler;
2221—Quick coupler;
2222—Drive component;
2223—Gripper;
2224—First gripper;
2225—Second gripper;
223—First robot media handler;
224—Second robot media handler;
225—Positioning component;
226—Mechanical sensor;
230—Recognizer;
240—Tool handler storage rack;
250—Second controller;
300—Management apparatus;
310—Operation and maintenance system interconnection module;
320—Controller interconnection module;
330—Database;
340—Controller management module;
350—System configuration module;
001—Operation and maintenance system;
002—Material warehouse;
400—Device assembling apparatus;
410—Receiving unit;
420—Parsing unit;
430—Sending unit.

DESCRIPTION OF EMBODIMENTS

A system, a method, and an apparatus for automatically assembling a device provided in this application are applicable to a data center scenario, to perform maintenance operations, such as fault operation and maintenance, part change and expansion, and part recovery of a scrapped server, on a device, and implement a method for automatically assembling a device without human participation. This avoids a problem that long time is consumed due to complex operation steps and a subjective error is caused by human participation, thereby improving processing efficiency and accuracy of a maintenance operation in a data center.

It should be noted that the device in this application includes a computing device (such as a server), a network device (such as a switch), or a storage device (such as a storage array). For ease of description, the following embodiments of this application provide descriptions by using an example in which the device is a server. When a device actually assembled by the device assembling system is not a server, structural details of specific structure designs of devices that are in apparatuses of the system and that rely on the device, such as structural details of an operating table configured to fasten a device, and structural details of a tool handler, may be correspondingly adjusted.

Figure 1:
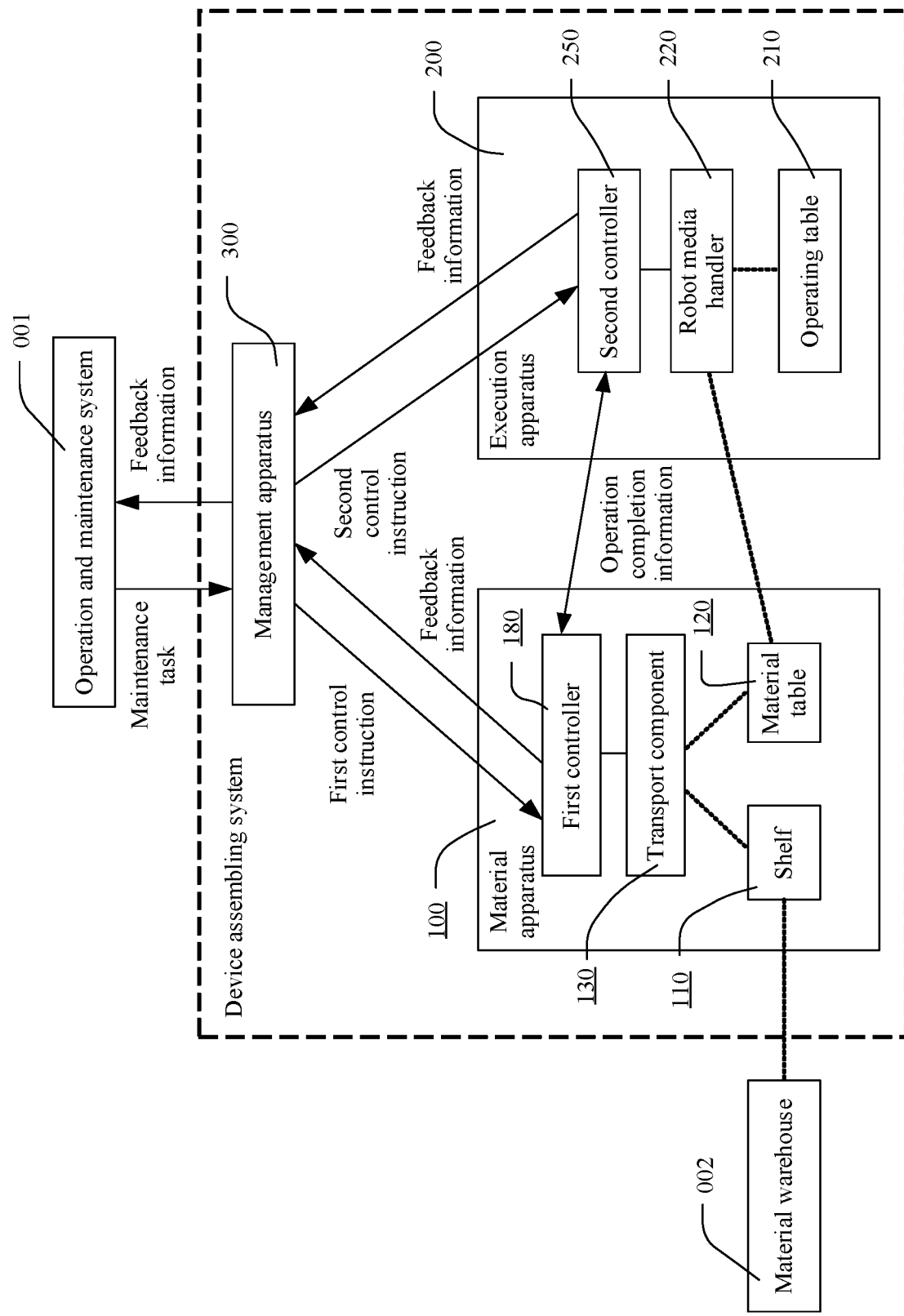
FIG. 1 is a schematic diagram of a layout of a system for automatically assembling a device according to an embodiment of this application.

FIG. 1 is a schematic diagram of a structure of a device assembling system according to this application. As shown in the figure, the system includes a management apparatus 300, a material apparatus 100, and an execution apparatus 200. The management apparatus 300 is connected to an operation and maintenance system 001 by using a network (for example, a wired or wireless network), and is configured to: obtain a maintenance task that is in maintenance work and that is sent by the operation and maintenance system 001, and parse the maintenance task sent by the operation and maintenance system into one or more control instructions. The management apparatus 300 is communicatively connected to the material apparatus 100 and the execution apparatus 200, and transmits the control instructions to the material apparatus and the execution apparatus. The maintenance task includes an operation type and an operation object. For example, the operation type specifically includes part installation, part replacement, or part removal, and the operation object specifically includes a number of a to-be-adjusted device, a model of a to-be-removed part, or a model of a to-be-assembled part. For example, the maintenance task indicates to add a 32G memory module to a server, remove a hard disk 1 in a device A, or replace a network adapter 1 in a device B with a network adapter 2.

The management apparatus 300 may further feed back information about completing the maintenance task (for example, work progress of the device assembling system and information about a part assembled to a server) to the operation and maintenance system, to synchronize a result of the maintenance task in a timely manner, thereby avoiding a problem that a subjective error is caused by human participation.

It should be noted that in this embodiment of this application, a communication connection means that a signal and information can be transmitted between two apparatus, where a specific connection manner is not limited; and may be a wired connection or may be a wireless connection. For example, the communication connection may be an Internet connection, a local area network connection, a network cable connection, a Bluetooth connection, an infrared connection, a 5G communications technology connection, or the like, provided that a communication purpose can be implemented.

Figure 2:
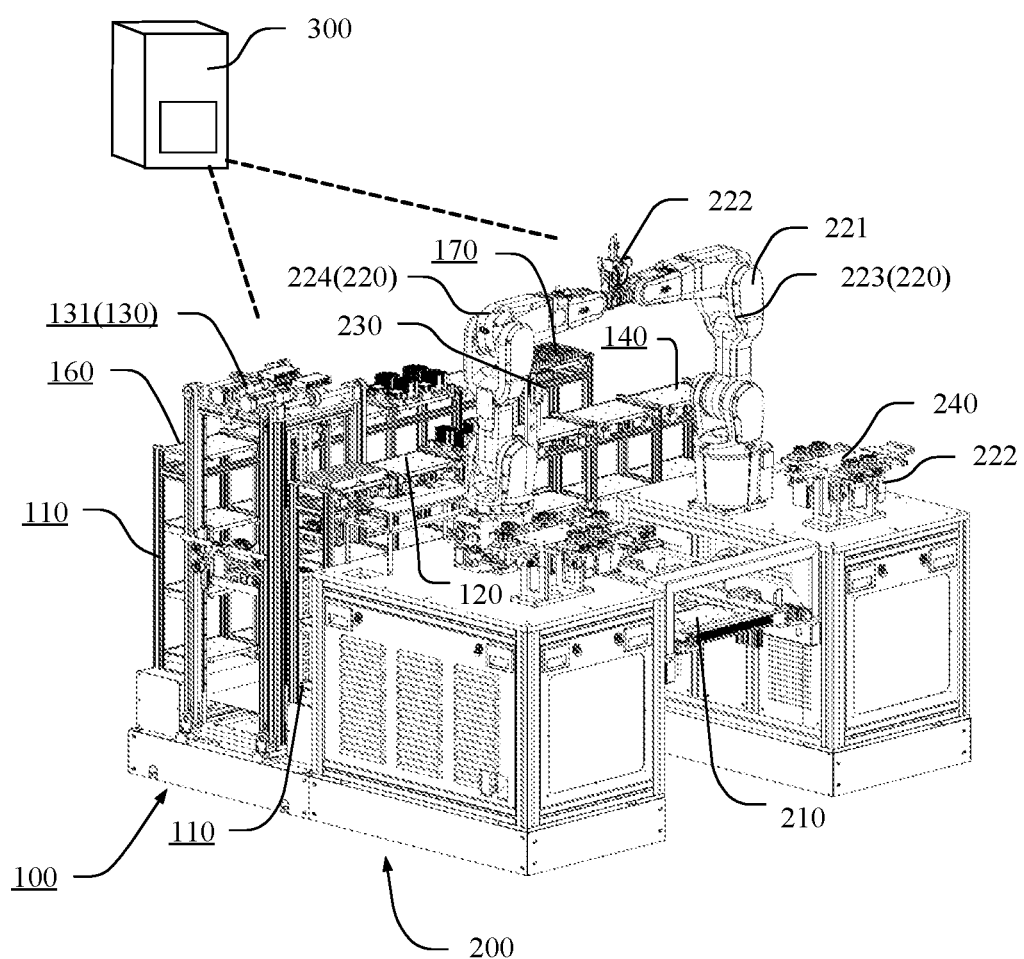
FIG. 2 is a schematic diagram of a structure of a system for automatically assembling a device according to an embodiment of this application.

FIG. 2 is a schematic diagram of a structure of a device assembling system according to an embodiment of this application. Refer to FIG. 1 and FIG. 2. The material apparatus 100 includes a first controller 180, a shelf 110, a material table 120, and a transport component 130. A material to be assembled to a server is placed in the shelf 110, and the material includes various types of to-be-assembled parts. The shelf 110 may be interconnected to a material warehouse, to place, in the shelf 110, a to-be-assembled part in the material warehouse, so that the device assembling system uses the to-be-assembled part. The first controller 180 is communicatively connected to the management apparatus 300, to receive a first control instruction of the management apparatus 300. The first controller 180 determines, based on a model of a to-be-assembled part in the first control instruction of the management apparatus 300, a position of the to-be-assembled part in the shelf 110. The to-be-assembled part is a part that is indicated in the maintenance task and that needs to be installed to a server, such as a CPU, a hard disk, or a memory module. If the first controller 180 obtains the position of the to-be-assembled part in the shelf 110 through calculation, the first controller 180 controls the transport component 130 to transport the to-be-assembled part from the shelf 110 to the material table 120. If the first controller 180 does not obtain the position of the to-be-assembled part in the shelf 110 through calculation, the first controller 180 may further generate alarm information, and feed back the alarm information to the management apparatus 300 as feedback information. Then, the management apparatus 300 feeds back the feedback information to the operation and maintenance system. For the foregoing maintenance task for which the alarm information is generated, human intervention needs to be performed after the alarm information is received. In this case, the device assembling system can skip the current maintenance task and execute a next maintenance task that can be executed, or may stop to wait for manual intervention.

It should be noted that in the reference signs in the accompanying drawings of the embodiments of this application, a reference sign under which there is a straight line identifier indicates a structure of the material apparatus, a reference sign under which there is a wavy line identifier indicates a structure of the management apparatus, a reference sign under which there is a dashed line identifier indicates a structure outside the device assembling system, and a reference sign under which there is no special identifier indicates a structure of the execution apparatus.

The execution apparatus 200 further includes a second controller 250, an operating table 210, and a robot media handler 220. The operating table 210 is configured to fasten the server. The operating table 210 may limit and lock the server, so that the robot media handler 220 performs an assembling operation on the server, to prevent the server from being displaced in an assembling process to affect accuracy. The second controller 250 is communicatively connected to the management apparatus 300, to receive a second control instruction of the management apparatus 300, and control, according to the second control instruction of the management apparatus 300, the robot media handler 220 to perform an action. Under control of the second controller 250, the robot media handler 220 grips the to-be-assembled part from the material table 120 of the material apparatus 100, and assembles the gripped to-be-assembled part to the server. The second controller 250 may further feed back a code of the installed to-be-assembled part and an operating status, time, and alarm information of each step of the execution apparatus to the management apparatus 300 as feedback information.

Figure 3:
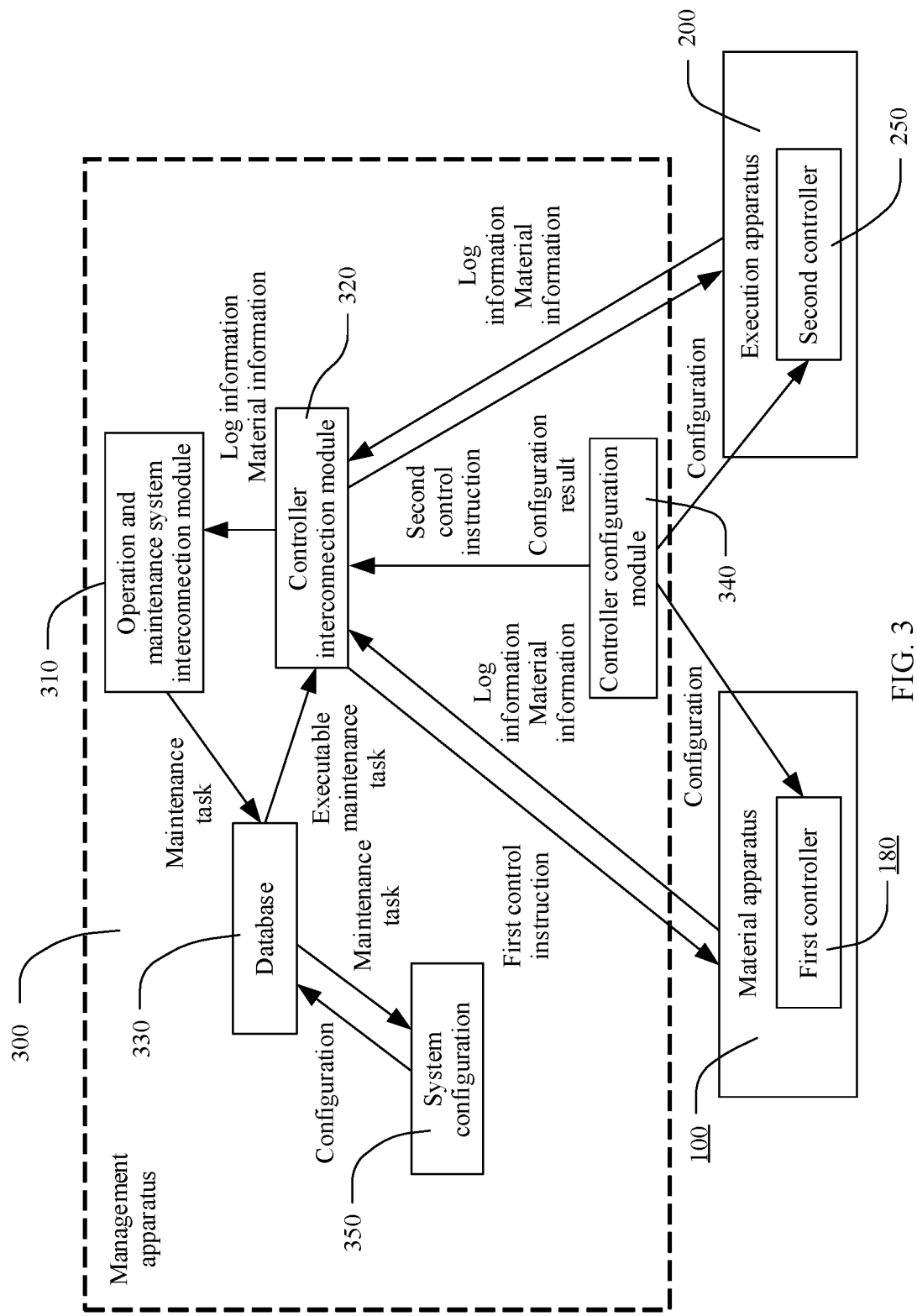
FIG. 3 is a schematic diagram of another layout of a system for automatically assembling a device according to an embodiment of this application.

FIG. 3 is a schematic diagram of another structure of a device assembling system according to an embodiment of this application. FIG. 3 mainly shows a structure of a management apparatus. In a specific embodiment, the management apparatus 300 may include an operation and maintenance system interconnection module 310, a controller interconnection module 320, a database 330, a controller management module 340, and a system configuration module 350. The operation and maintenance system interconnection module 310 obtains a maintenance task sent by the operation and maintenance system; and parses and verifies the maintenance task, and then writes the maintenance task into the database 330 of the management apparatus 300. The operation and maintenance system interconnection module 310 further obtains feedback information of the controller interconnection module 320, and feeds back the feedback information to the operation and maintenance system, so that the operation and maintenance system obtains, in real time, work progress of the device assembling system and information about a part assembled to a server. The controller interconnection module 320 periodically searches the database 330 for an executable maintenance task, and decomposes a found executable maintenance task into control instructions. The controller interconnection module 320 is communicatively connected to the material apparatus 100 and the execution apparatus 200, to transmit the control instructions to the material apparatus 100 and the execution apparatus 200. The controller interconnection module 320 further receives log information and material information of the material apparatus 100 and the execution apparatus 200, and feeds back the log information and the material information to the operation and maintenance system interconnection module. The controller management module 340 is configured to configure the first controller 180 located in the material apparatus 100 and the second controller 250 located in the execution apparatus 200, and may specifically configure an address of the first controller 180 and an address of the second controller 250, such as IPs (internet protocol) and port numbers. The controller management module 340 is further configured to feed back a result of configuring the first controller 180 and the second controller 250 to the controller interconnection module 320, so that the controller interconnection module 320 communicates with the first controller 180 and the second controller 250. The system configuration module 350 is configured to configure and manage a BOM and barcode information of a server part, such as a CPU, a hard disk, or a memory, in the database 330.

Figure 4:
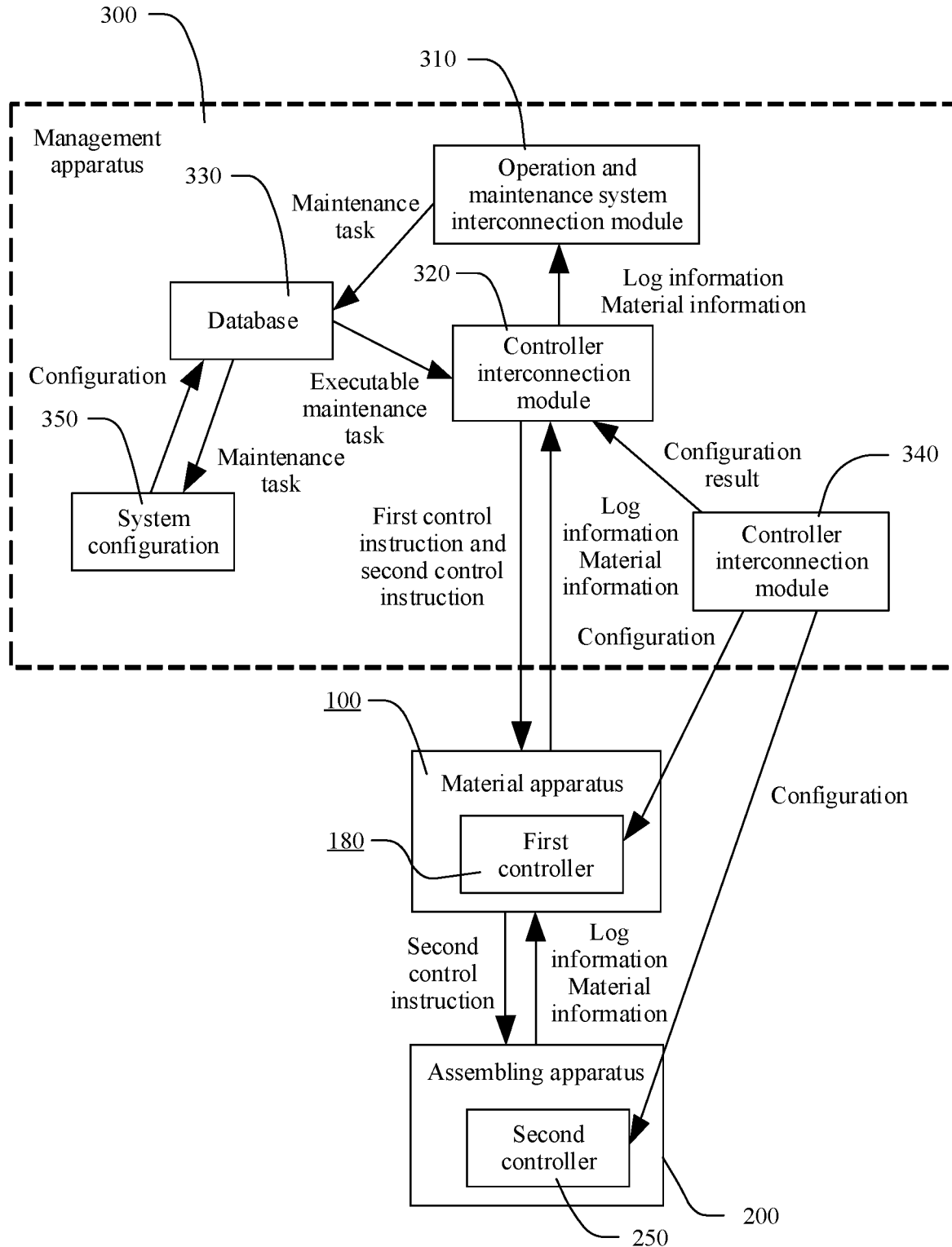
FIG. 4 is a schematic diagram of another layout of a system for automatically assembling a device according to an embodiment of this application.

That the second controller 250 is communicatively connected to the management apparatus 300 may indicate that the second controller 250 is directly communicatively connected to the management apparatus 300, or may indicate that the second controller 250 is first communicatively connected to the first controller 180, and then the first controller 180 is communicatively connected to the management apparatus 300, so that the communication connection between the second controller 250 and the management apparatus 300 is implemented by using the first controller 180. Refer to FIG. 3. The management apparatus 300 may directly send the second control instruction to the second controller 250, and the second controller 250 directly feeds back the log information and the material information to the management apparatus 300 as feedback information. Alternatively, in another embodiment, FIG. 4 is a schematic diagram of another layout of a device assembling system according to an embodiment of this application. A difference between the embodiment shown in FIG. 4 and the embodiment shown in FIG. 3 lies in only a connection manner between the second controller 250 and the management apparatus 300. In the embodiment shown in FIG. 4, the management apparatus 300 transmits the first control instruction and the second control instruction to the first controller 180 as one control instruction, and then the first controller 180 generates a second control instruction and transmits the second control instruction to the second controller 250. The second controller 250 first feeds back log information and material information to the first controller 180 as feedback information, and then the first controller 180 feeds back the feedback information to the management apparatus 300. This facilitates simplification of a control program and reduction of laid signal transmission lines.

The maintenance task may further include a task type, such as a scheduled task, an automatic task, and a manual task. The scheduled task is a task that starts to be executed when an execution time point reaches, the automatic task is an immediately-executed task, and the manual task is a task executed after an operation and maintenance person performs manual determining.

When specifically searching for an executable maintenance task, the management apparatus needs to compare a code of a server in a maintenance task with a code of a to-be-assembled server. The controller interconnection module determines whether the current to-be-assembled server performs the maintenance task. If the code of the current to-be-assembled server matches the code of the server in the maintenance task, the controller interconnection module decomposes the found executable maintenance task into control instructions, and transmits the control instructions to the material apparatus and the execution apparatus, so that the material apparatus and the execution apparatus complete the maintenance task. Specifically, the controller interconnection module parses the maintenance task into a task flow, so that the material apparatus and the execution apparatus perform related actions in an orderly manner based on the task flow. If the code of the current to-be-assembled server does not match the code of the server in the maintenance task, the controller interconnection module continues to periodically search the database for an executable maintenance task until an executable maintenance task is found.

The operation type in the maintenance task sent by the operation and maintenance system to the management apparatus may alternatively include part removal, that is, a part of a server is removed and recycled for reusing. The execution apparatus is alternatively configured to remove the part of the server based on the maintenance task. Specifically, under control of the second controller, the robot media handler removes, from the server as a removed part, a part that is of the server and that needs to be removed, and places the removed part at a specified position. The second controller may be alternatively configured to feed back information about the removed part and an operation record to the management apparatus 300 as feedback information. In this solution, the device assembling system in this embodiment of this application may be used to disassemble and reuse a server that needs to be scrapped, that is, remove and reuse a part that does not reach a service life and that can still be used. In this solution, on one hand, the reused part of the server can be automatically removed. On the other hand, information about the reused part may be further fed back to the operation and maintenance system as a record, to facilitate reusing of the reused part.

It should be noted that the material in the embodiments of this application includes a to-be-assembled part, or includes a removed part. Any part provided in this application belongs to one type of material.

Still refer to FIG. 2. The material apparatus 100 may further include a material transfer table 140. The material transfer table 140 is configured to carry the foregoing removed part, that is, the robot media handler 220 of the execution apparatus 200 places the removed part on the material transfer table 140 after removing the removed part, and then the removed part is manually or mechanically transferred. Specifically, the removed part may be transported to the warehouse or the shelf 110 by using the transport component 130 of the material apparatus 100. Specifically, a structure of the material transfer table 140 may be similar to a structure of the material table 120. Specifically, a size of the material table 120 and a size of the material transfer table 140 may be designed based on an actual requirement.

In an optional implementation, the material transfer table 140 and the material table 120 are in an integral structure. Under control of the first controller 180, a shuttle 131 may further move to the material transfer table 140, and a grip component grips the removed part placed on the material transfer table 140; and then the shuttle 131 moves to the shelf 110 and places the removed part in the shelf 110.

During part removal, only a reused part may be removed for reusing (for example, the part may be recycled), and remaining parts are scrapped together with a structure such as a server housing. Alternatively, all parts of a scrapped server may be removed, to facilitate classification. When all the parts of the scrapped server are removed, the operation and maintenance system may determine, based on information about the removed parts, whether to scrap or reuse the removed parts. If the removed parts are scrapped, the robot media handler of the execution apparatus may place the removed parts in a scrap area. If the removed parts can be reused, the robot media handler may place the removed parts on the material transfer table. The first controller 180 may determine vacant positions that are in the shelf and at which the removed parts can be placed; and then control the transport component to transfer the removed parts from the material transfer table to the vacant positions in the shelf, and upload the information about the removed parts, information about the placement positions of the removed parts, operation records, and the like to the management apparatus as feedback information, to facilitate reusing of the removed parts. Specifically, when the device assembling system assembles a server, the foregoing removed parts may be reused based on a requirement, to facilitate implementation of reusing of the server parts, thereby helping save a resource.

In another possible implementation, the operation type in the maintenance task sent by the operation and maintenance system to the management apparatus may alternatively include part replacement, that is, a server may be modified by using the device assembling system in this embodiment of this application. Specific operations include: removing a part that is of the existing server and that needs to be upgraded or replaced, equivalent to a maintenance task in which an operation type is part removal; and then installing a new part that meets a requirement, equivalent to a maintenance task in which an operation type is part installation.

When the device assembling system in this application is specifically applied to modifying the server, if there is a shield outside the removed part, the robot media handler of the execution apparatus may further remove the shield, to expose the removed part, thereby facilitating the removal operation.

As a possible embodiment, the material apparatus and the execution apparatus in the device assembling system provided in this application are in an integral structure. That is, the material apparatus and the execution apparatus may be welded to form a whole shown in FIG. 2. Alternatively, the device assembling system further includes a base, and both the material apparatus and the execution apparatus are fastened to the base. Certainly, the material apparatus and the execution apparatus may be alternatively formed into an integral structure in a detachable connection manner such as a bolt connection.

In addition, in this embodiment of this application, a size of the device assembling system may be adjusted based on an actual application case. For example, if a size of an assembled device is relatively small, and a size of a to-be-assembled part is also relatively small, the size of the device assembling system may be designed to be relatively small. In this application, the size of the device assembling system is not limited, provided that assembling work can be completed.

As a possible embodiment, the device assembling system provided in this application further has a movable apparatus, configured to implement movement of the automatic assembling system, so that the system can implement a maintenance operation of a part in the device at any position in a data center, and obtain a required part from the material warehouse. In a specific embodiment, the movable apparatus may be installed at bottom portions of the material apparatus and the execution apparatus, and may include a castor. The castor may be manually driven to rotate, to drive the device assembling system to move. Alternatively, the movable apparatus includes a drive structure, and the drive structure drives the castor to rotate, to drive the device assembling system to move.

The execution apparatus may include one robot media handler, or may include two or more robot media handlers, to facilitate improvement of working efficiency of the execution apparatus. Specifically, when the execution apparatus includes one robot media handler, the robot media handler executes the control instructions in sequence to complete the maintenance task. When the execution apparatus includes at least two robot media handlers, when the at least two robot media handlers are used to assemble a server, the at least two robot media handlers may simultaneously perform assembling. Specifically, an action path may be designed, and two robot media handlers simultaneously act on a premise of preventing structural interference between the robot media handlers. For example, when the server is modified, one robot media handler may remove a removed part that is of the server and that needs to be removed, and the other robot media handler moves to the material table to grip a to-be-assembled part, to improve working efficiency.

Figure 5:
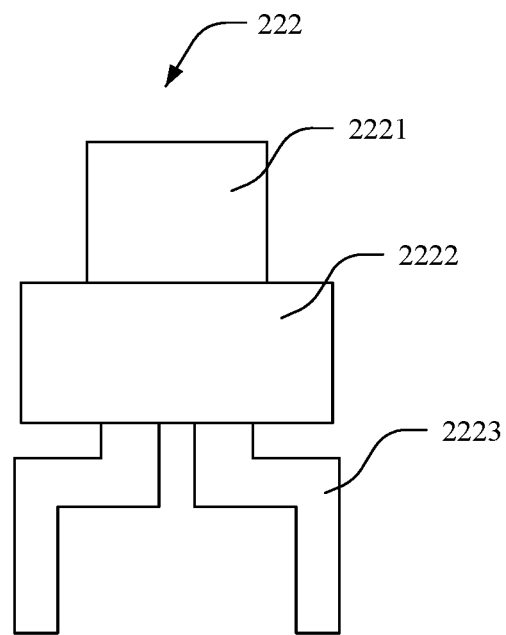
FIG. 5 is a schematic diagram of a structure of a tool handler according to an embodiment of this application.

Because the robot media handler performs different specific actions on different materials and performs different specific actions on a same material, different tool handlers need to be configured for the robot media handler for different operations of different materials. As shown in FIG. 2, the robot media handler 220 includes a robot arm 221 and tool handlers 222. Manners of disposing and replacing different tool handlers 222 in each robot media handler 200 are not specifically limited. In a possible implementation, the tool handler 222 is detachably installed to the robot arm 221. Specifically, a quick structure may be provided between the tool handler 222 and the robot arm 221. FIG. 5 is a schematic diagram of a structure of a tool handler according to this application. As shown in the figure, the tool handler 222 includes a quick coupler 2221, a drive component 2222, and a gripper 2223. The drive component 2222 is configured to drive the gripper 2223 to grip a material, and the quick coupler 2221 is configured to be installed to the robot arm 221. Still refer to FIG. 2. The execution apparatus 200 includes a tool handler storage rack 240. The tool handler 222 may be stored in the tool handler storage rack 240. The second controller 250 may control the robot arm 221 to move to the tool handler storage rack 240, to install a tool handler 222 that needs to be used to the robot arm 221 by using the quick structure. In another possible implementation, the tool handler storage rack 240 has a first drive structure, and the first drive structure can drive the tool handler storage rack 240 to move or rotate. Therefore, the tool handler storage rack 240 can move or rotate based on control of the second controller 250, so that an accommodation area of a tool handler 222 that needs to be used or a tool handler 222 that needs to be removed from the robot arm 221 is located at a specified position. In a specific embodiment, for each execution apparatus, one tool handler storage rack 240 may be configured, or two or more tool handler storage racks 240 may be disposed. Alternatively, the tool handler storage rack 240 is disposed in a one-to-one correspondence with the robot media handler.

In another possible implementation, the robot arm of the robot media handler may further include a hollow cavity. The cavity is configured to store various types of tool handlers. When determining a type of a required tool handler, the second controller may dispose the selected tool handler at a working position through extension and contraction in the cavity.

In another possible implementation, the robot arm is connected to a tool handler component. The tool handler component includes a base and tool handlers installed on the base. The base has a second drive structure, and the second drive structure can drive the base to rotate or move relative to the robot arm. Therefore, the base can move or rotate based on control of the second controller, so that a required target tool handler is located at a working position.

Figure 6:
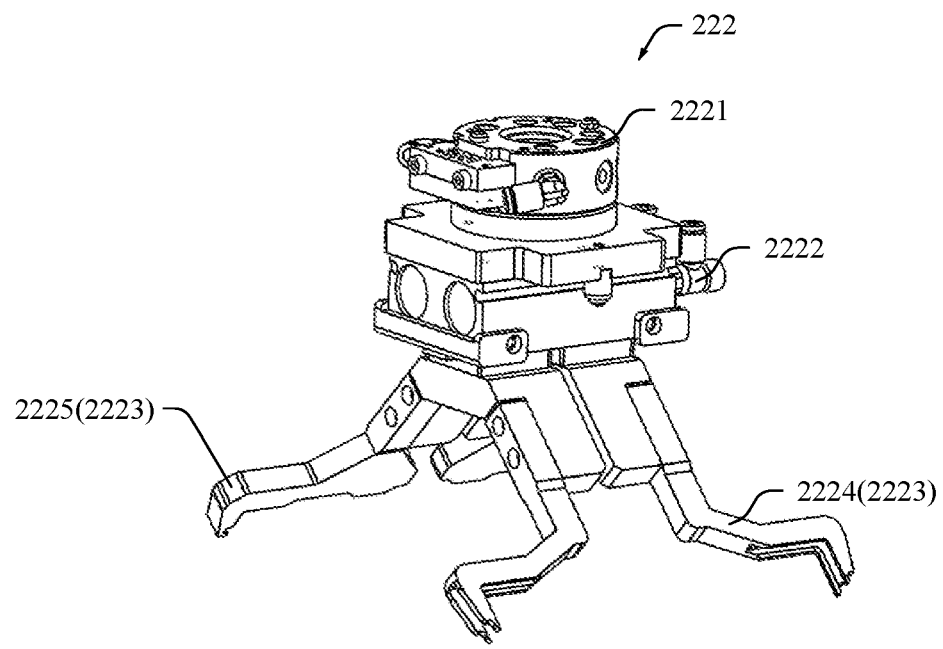
FIG. 6 is a schematic diagram of a structure of a tool handler according to an embodiment of this application.

In addition, to reduce a tool handler replacement frequency of the robot arm and improve a process beat, each tool handler may have at least two grippers, and a proper gripper of the tool handler may be selected by using an action of the robot arm, to perform a corresponding action. In a specific embodiment, the two grippers of the tool handler may be disposed as an integral structure, so that the tool handler has a relatively simple structure and occupies relatively small space. On one hand, interference that may occur between robot media handlers can be reduced. On the other hand, this facilitates simplification of an action of the robot media handler. Alternatively, FIG. 6 is a schematic diagram of a structure of a tool handler according to this application. The foregoing two grippers 2223 are in a split structure, and a working position of the gripper 2223 is adjusted by rotating the robot arm 221, so that a gripper 2223 that needs to be used works.

Still refer to FIG. 2. The execution apparatus 200 further includes a recognizer 230 communicatively connected to the second controller 250. The recognizer 230 may be configured to scan an identifier of a to-be-assembled part and/or an identifier of a removed part, to determine whether the current scanned part matches a part recorded by the management apparatus 300, thereby improving accuracy of the device assembling system, and preventing an error in an assembled part or a removed part of a server. The identifier includes content, such as a picture or a barcode, used to identify attribute information, such as a type and a specification, of the part. The recognizer 230 is a device that can use a barcode scanner, a two-dimensional code scanner, a camera, or the like to identify attributes (such as a type and a specification) of a part by using an identifier (such as a barcode) of the part. Next, after griping a part, the robot media handler may first move to an area in which the recognizer 230 is located, and enable an identifier of the part to face the recognizer 230. The recognizer 230 scans the identifier of the gripped part. After the second controller 250 performs comparison and matching on information obtained by the recognizer 230 with part information in the second control instruction sent by the management apparatus 300, the second controller 250 further controls the robot media handler 220 to complete installation. Finally, the second controller 250 feeds back information about task completion to the management apparatus 300. If the information obtained by the recognizer 230 and the part information in the second control instruction sent by the management apparatus 300 do not match after being compared with each other, the second controller 250 sends alarm information. In this solution, information about a current part is obtained by using the recognizer 230 and is compared with required information, so that it can be ensured that a part that is being processed by the execution apparatus 200 matches a work order task, to improve reliability and operation accuracy of the execution apparatus 200.

Figure 7:
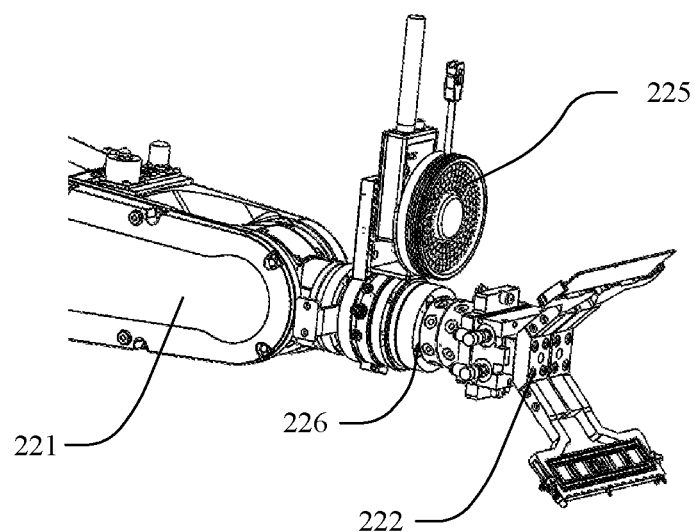
FIG. 7 is a schematic diagram of a partial structure of a robot media handler according to an embodiment of this application.

FIG. 7 is a schematic diagram of a partial structure of a robot media handler according to an embodiment of this application. As shown in the figure, each robot media handler further includes a positioning component 225. The positioning component 225 is connected to the second controller 250. The second controller 250 may determine, based on the positioning component 225, a position of a part to be gripped by the robot media handler and a position at which the gripped part is to be placed, to ensure positioning accuracy of the robot media handler. In a specific embodiment, the positioning component 225 may be a visual component. The visual component is connected to the second controller 250. The visual component scans a position at which the robot media handler 220 is to perform an operation, and extracts a feature of a scanned area; and compares the feature of the scanned area with a feature of a target position to determine coordinates of the position at which the robot media handler 220 is to perform the operation, and then feeds back the coordinates to the second controller 250, to accurately adjust a posture of the robot media handler 220, thereby improving action accuracy of the execution apparatus 200. The feature of the target position may be set in advance and stored in the visual component. The visual component may be any type of device that can complete object recognition, such as a sensor (such as a radar) or a camera.

Still refer to FIG. 7. The robot media handler further includes a mechanical sensor 226, and the mechanical sensor 226 is connected to the second controller 250. When the robot media handler 220 grips a part and moves, it may be determined, by using the mechanical sensor 226, whether the part encounters an obstacle on a moving path. The second controller 250 may receive a force value fed back by the mechanical sensor 226, and compare the force value with a specified threshold. When the force value fed back by the mechanical sensor 226 reaches the specified threshold, it is considered that the part encounters an obstacle or is over-installed. The second controller 250 controls the robot media handler 220 to stop a current action, and the second controller 250 generates alarm information, to prevent the part and a structure around the robot media handler 220 from being damaged. In this solution, the part and the structure around the robot media handler 220 can be protected in a relatively reliable manner, to prevent the part or a server from being damaged due to excessive operation of the robot media handler 220.

When a part is installed to a server or placed on a material tray, the part may be installed to the server or placed on the material tray by controlling an action stroke of the robot media handler.

In a possible embodiment, the mechanical sensor 226 further monitors a force value of the mechanical sensor 226 when the robot media handler installs a part or inserts a part into a material tray. When the force value of the mechanical sensor 226 reaches a specified threshold, it may be further considered that the part is installed in place, and the robot media handler can lay down the part and start to perform a next action. In this solution, part installation reliability can be improved, to prevent a part from being not installed in place, or prevent the part or a server from being damaged due to an excessive installation stroke.

The transport component of the material apparatus may be implemented through manual driving. For example, the robot media handler is manually operated, to grip a to-be-assembled part from a position at which the to-be-assembled part is located in the shelf, and transport the gripped to-be-assembled part to the material table to wait for the execution apparatus to use the to-be-assembled part; or the robot media handler is manually operated, to grip a removed part from the material transfer table and transfer the removed part to a specified position, such as the shelf or the scrap area. Alternatively, the to-be-assembled part may be manually taken out from the position at which the to-be-assembled part is located in the shelf, and the to-be-assembled part may be transported to the material table to wait for the execution apparatus to use the to-be-assembled part; or the removed part placed on the material transfer table may be manually transferred to the specified position, such as the shelf or the scrap area. Alternatively, the transport component is a robot media handler connected to the first controller, and the first controller may control, based on a control instruction of the management apparatus, the robot media handler to automatically move to the shelf to grip the to-be-assembled part and transport the to-be-assembled part to the material table; or the first controller may control the robot media handler to automatically move to the material transfer table to grip the removed part and transport the removed part to the shelf or the scrap area. Alternatively, the transport component may be the shuttle connected to the first controller, and under control of the first controller, the shuttle can move to the shelf to grip the to-be-assembled part and transport the to-be-assembled part to the material table.

Still refer to FIG. 2. The transport component 130 may be the shuttle 131 communicatively connected to the first controller 180. Under control of the first controller 180, the shuttle 131 can move nearby the shelf 110. The shuttle includes the grip component. The grip component can move to a position at which a material is placed in the shelf 110, to grip the material. Then, the shuttle 131 moves to the vicinity of the material table 120, and the grip component places the gripped material on the material table 120. The grip component can move in various directions, to move to the position at which the part is placed in the shelf 110, and transport the part to the material table 120.

Still refer to FIG. 2. In a specific embodiment, the material apparatus 100 may include two rows of shelves 110. The shuttle 131 is disposed between the two rows of shelves 110, and can move along a gap between the two rows of shelves 110, to transport a material in the shelves 110 or place a material in the shelves 110. In this solution, if the shuttle 131 is located between the two rows of shelves 110, it is helpful for the shuttle 131 to operate a material in the two shelves 110 within a relatively short stroke, to reduce space occupied by the material apparatus 100; and it is also helpful for reducing a stroke of the shuttle 131, to improve working efficiency of the shuttle 131. To implement movement of the shuttle 131 between the two rows of shelves 110, a track may be disposed between the two rows of shelves 110, and the shuttle 131 runs on the track.

When the shelf 110 of the material apparatus 100 is specifically disposed, the shelf 110 may be enabled to have a plurality of slots configured to store materials. A positioning structure is disposed in each slot. The positioning structure may cooperate with the transport component 130, so that the transport component 130 places a material in the slot and takes out a material from the slot. In addition, the material is stored in a slot manner, so that the first controller 180 determines coordinates of a material storage position, to control the transport component to accurately position and transport the stored material. In a specific embodiment, a size of the shelf may be designed based on a quantity and sizes of materials that need to be placed. For example, if a relatively small quantity of materials need to be placed, a relatively small quantity of slots may be designed for the shelf; and if a size of the material that needs to be placed is relatively small, a size of the slot is also relatively small, and correspondingly, a relatively small size may also be designed for the shelf.

Figure 8:
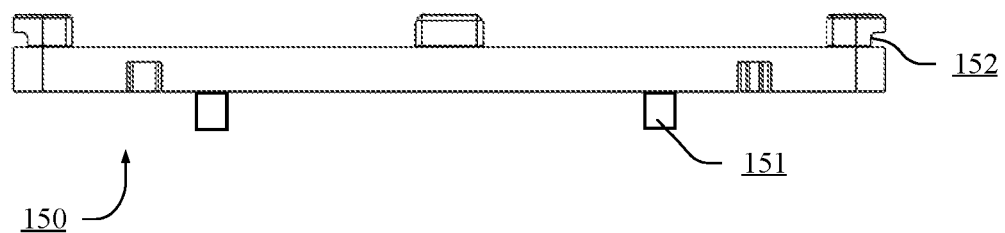
FIG. 8 is a schematic diagram of a structure of a material tray according to an embodiment of this application.

FIG. 8 is a schematic diagram of a structure of a material tray according to an embodiment of this application. As shown in the figure, the material apparatus 100 further includes a material tray 150 configured to place a material, and the material tray 150 is placed in the slot in the shelf 110. When transporting a material, the transport component 130 may transport a material tray 150, to help normalize a structure of the transport component 130, and different transport components 130 do not need to be designed corresponding to different materials, to help simplify a structure of the transport component 130.

In a specific embodiment, the material tray 150 may have protrusions 151, and the transport component 130 has pawls. A structure of the pawl is adapted to the protrusion 151 of the material tray 150. Therefore, the pawl of the transport component 130 can grip the protrusion 151, to hook out or push in the material tray 150. Edges of the material tray 150 further have clamping positions 152, and the clamping positions 152 can be clamped to the slot in the shelf 110, to place the material tray 150 in the shelf 110. The protrusions 151 may be specifically disposed at a bottom portion of the material tray 150. Therefore, the material tray 150 can be lifted after the pawls grip the protrusions 151, so that the material tray 150 is not prone to be detached from the pawls of the transport component 130, thereby improving reliability of transporting the material tray 150 by the transport component 130.

Still refer to FIG. 2. To facilitate transfer of a material in the warehouse to the material apparatus 100, the material apparatus 100 may further include a material inlet table 160. The material inlet table 160 performs material transmission with the external warehouse. The first controller 180 may further control the transport component 130 to transport a material on the material inlet table 160 to the shelf 110. The first controller 180 may further feed back feedback information, such as information about the material transported from the material inlet table 160 to the shelf 110, a position at which the material is placed in the shelf 110, and log information, to the management apparatus 300. The management apparatus 300 may feed back the feedback information to the operation and maintenance system. In a specific embodiment, materials, such as a to-be-assembled part, are accommodated in the shelf 110 of the material apparatus 100. When the materials accommodated in the shelf 110 cannot meet a requirement, for example, a quantity of parts of a model or a type is less than a specified threshold, the material apparatus 100 performs material transmission with the warehouse to obtain a required part of a type from the warehouse, and places the part in the shelf 110 after passing the part through the material inlet table.

Still refer to FIG. 2. The material apparatus 100 may further include a material outlet table 170, and the material outlet table 170 may also perform material transmission with the external warehouse. The first controller 180 may further control the transport component 130 to transport a removed part on the material transfer table 140 to the material outlet table 170, and feed back feedback information, such as information about the removed part and log information, to the management apparatus 300. The management apparatus 300 may feed back the feedback information to the operation and maintenance system. In a specific embodiment, when material composition in the shelf 110 is not suitable for device maintenance, for example, a quantity of materials in the shelf 110 changes after a removed part is placed in the shelf 110 or some to-be-installed parts are used, some materials with relatively large quantities and relatively low use probabilities in the shelf 110 may be transferred to the warehouse by using the material outlet table 170, to place required parts of some types in the shelf 110, so that materials in the shelf 110 relatively match a device maintenance requirement.

The material apparatus in this embodiment of this application is further configured to: if a preset condition is met, adjust a position of a slot of a to-be-assembled part in the shelf, or adjust a type of a to-be-assembled part placed in a slot. Specifically, when a use frequency of a part of a type reaches a first threshold, the material apparatus may consider, based on historical data, that the use frequency of the part of the type is relatively high, and place the part of the type in a slot that is in the shelf and from which a part is relatively easy to be gripped, thereby improving working efficiency of the material apparatus. The use frequency is a quantity of times of using the part of the type in first time. The first threshold may be manually set based on experience, or may be obtained by the system through calculation based on historical data. The adjustment action may be performed when the system is idle without occupying device maintenance time. In an adjustment process, a to-be-assembled material may be transported by using the transport component, and a vacant slot may be used as an intermediate platform. First, a first part that has been placed in a slot in which a to-be-assembled part needs to be changed is removed from the slot and is placed in the vacant slot. Then, a second part that needs to be placed in the slot in which a to-be-assembled part needs to be changed is placed in the slot. For the first part placed in the vacant slot, the first part may be placed in a slot in which the second part is originally placed, or an operation of storing the first part may be determined based on a use frequency of the first part. A type of the to-be-assembled part includes a processor, a memory module, a network adapter, or a hard disk.

As a possible implementation, a quantity of material apparatuses and a quantity of execution apparatuses in the device assembling system are not specifically limited, and the material apparatus and the execution apparatus may be in a one-to-one correspondence, or may not be in a one-to-one correspondence. For example, two or more execution apparatuses may be configured for one material apparatus, or two or more material apparatuses may be configured for one execution apparatus. Alternatively, the device assembling system may simultaneously modify a plurality of parts of a server, provided that an action of the material apparatus and an action of the execution apparatus are properly planned.

Figure 9:
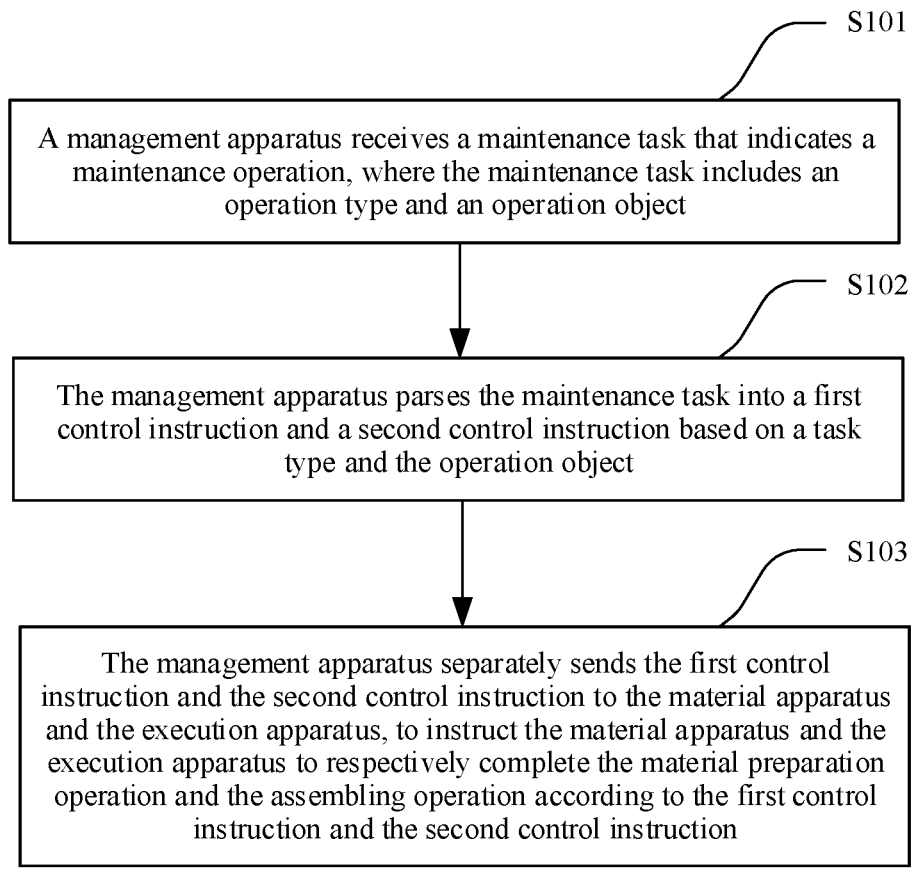
FIG. 9 is a schematic flowchart of a method for automatically assembling a server according to this application.
Figure 10A:
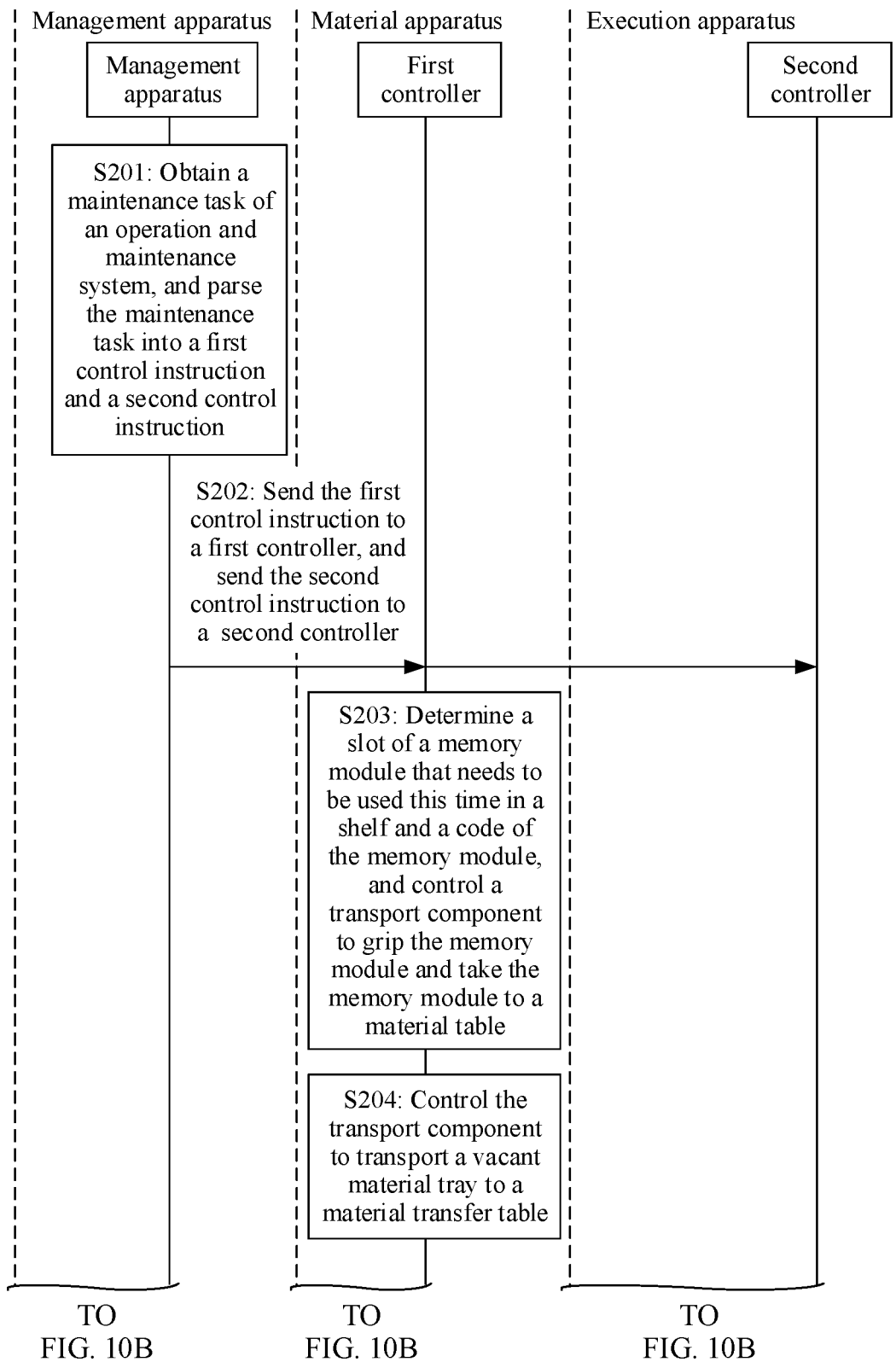
FIG. 10A, FIG. 10B, and FIG. 10C are a flowchart in which a system for automatically assembling a device modifies a memory module according to an embodiment of this application.
Figure 10B:
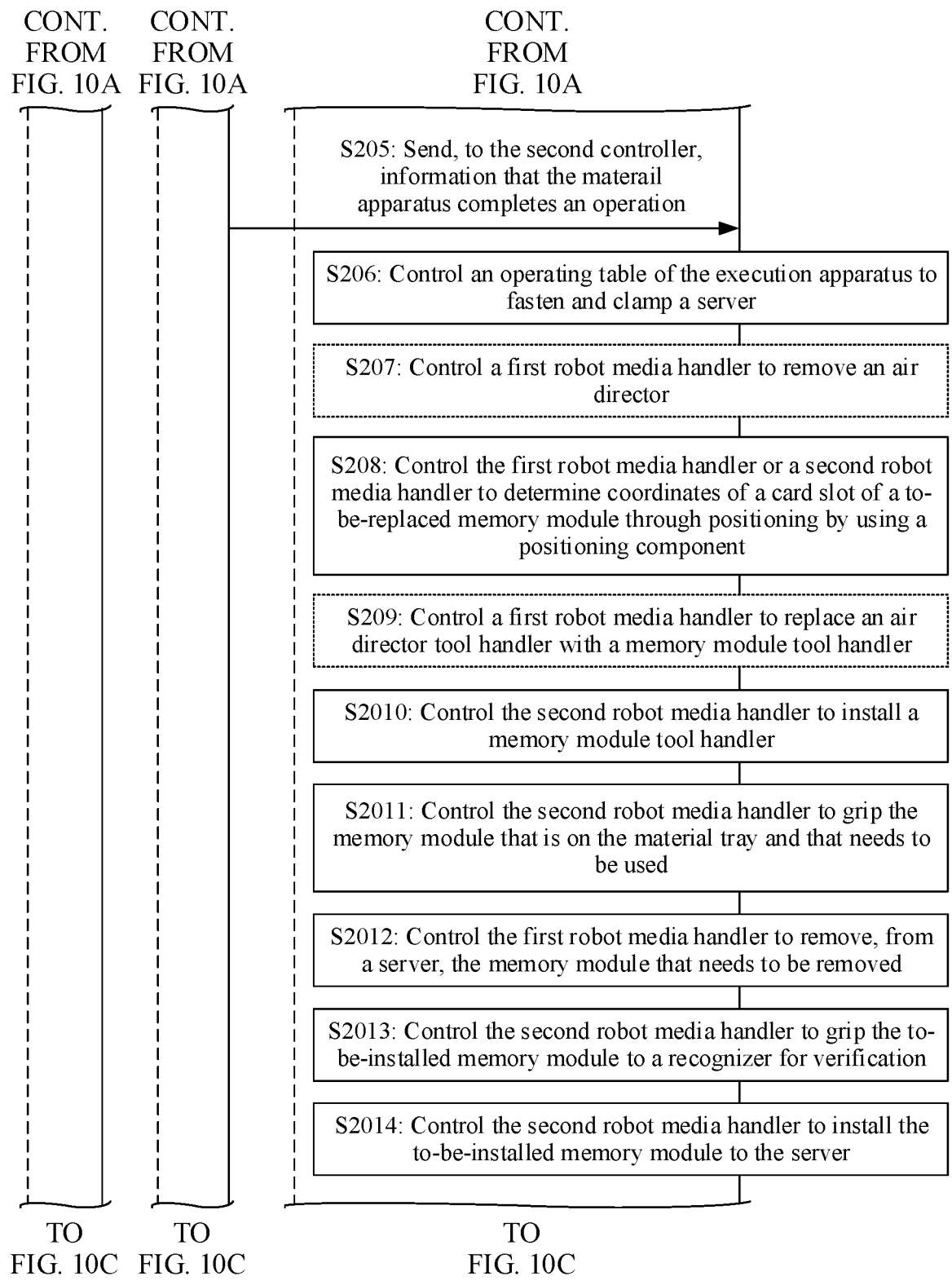
Figure 10C:
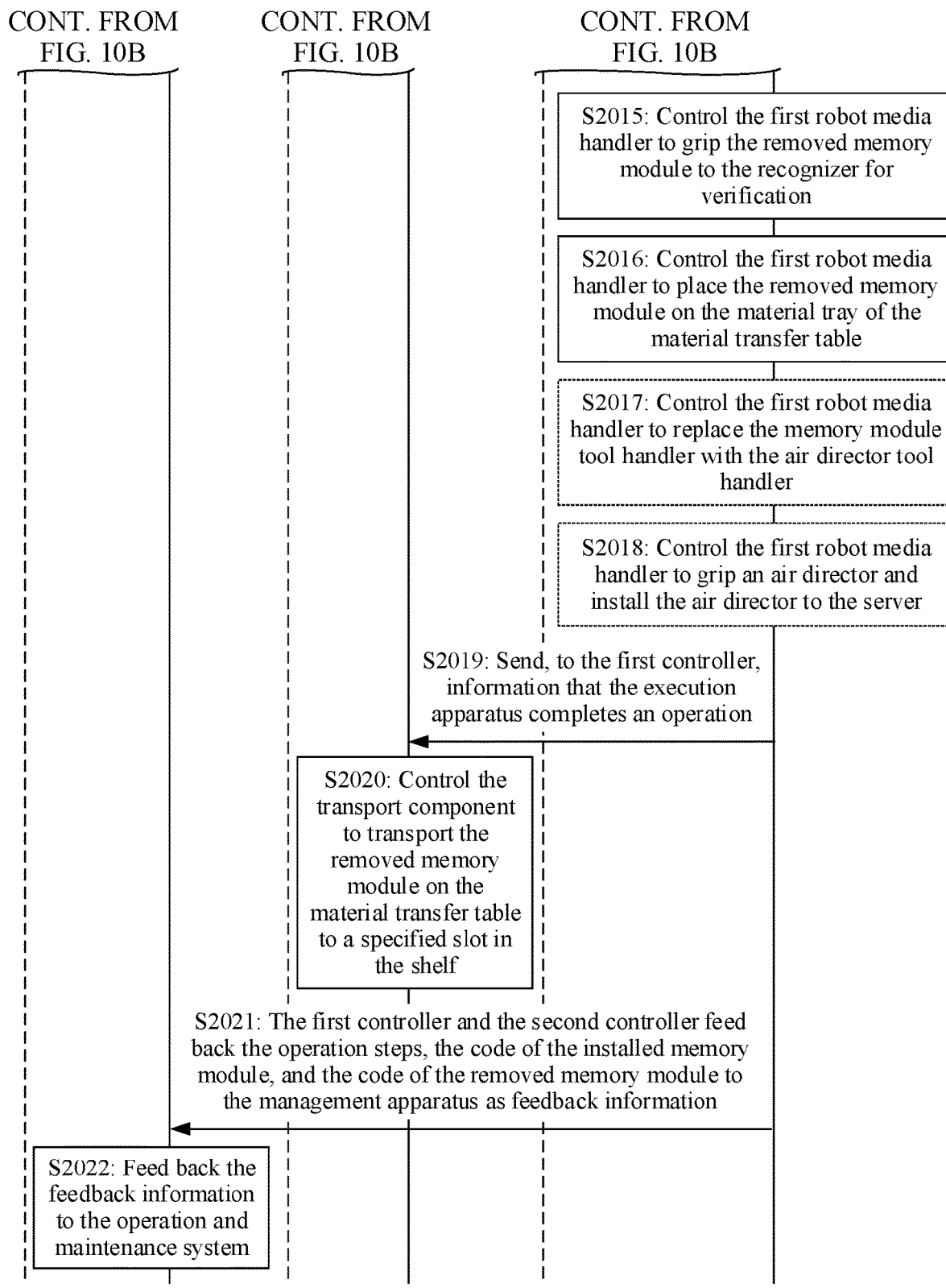

Based on a same inventive concept, this application further provides a device assembling method. FIG. 9 is a schematic flowchart of a method for automatically assembling a server according to this application. As shown in the figure, the method includes the following steps:

S101: A management apparatus receives a maintenance task that indicates a maintenance operation, where the maintenance task includes an operation type and an operation object.

S102: The management apparatus parses the maintenance task into a first control instruction and a second control instruction based on the operation type and the operation object, where the first control instruction is used to instruct a material apparatus to complete a material preparation operation, and the second control instruction is used to instruct an execution apparatus to complete an assembling operation.

S103: The management apparatus separately sends the first control instruction and the second control instruction to the material apparatus and the execution apparatus, to instruct the material apparatus and the execution apparatus to respectively complete the material preparation operation and the assembling operation according to the first control instruction and the second control instruction.

In this solution, a device assembling system is used to assemble a part of a server. First, the management apparatus obtains the maintenance task, determines the operation type and the operation object, and generates the first control instruction and the second control instruction. The material apparatus prepares, according to the first control instruction, the to-be-assembled part required for server assembling, and a robot media handler of the execution apparatus assembles, according to the second control instruction, the to-be-assembled part prepared by the material apparatus to the server. Therefore, automatic assembling of the server can be implemented to replace a manual operation, thereby helping improve efficiency. In addition, assembling log information, installed-part information, and the like may be uploaded to the management apparatus through communication between a first controller and a second controller and the management apparatus, to ensure real-time updating and accuracy of material information of the server. Specifically, the log information is an operating status, time, alarm information, and the like of each step.

The operation object may include a number of a to-be-adjusted device, a model of a to-be-removed part, or a model of a to-be-assembled part. The operation type may include part installation, part removal, or part replacement. For example, if a maintenance task is replacing a 16G memory module of a server with a 32G memory module, a operation type is part replacement, a number of a to-be-adjusted device is a number of the server to facilitate determining of a specific server on which the part replacement operation is performed, a model of a to-be-removed part is the 16G memory module, and a model of a to-be-assembled part is the 32G memory module.

The maintenance task may further include a task type, such as a scheduled task, an automatic task, and a manual task. The scheduled task is a task that starts to be executed when an execution time point reaches, the automatic task is an immediately-executed task, and the manual task is a task executed after an operation and maintenance person performs manual determining.

During implementation of the device assembling method, in a possible implementation, the management apparatus may first send the first control instruction and the second control instruction to the material apparatus as one control instruction, and then the material apparatus generates a second control instruction and sends the second control instruction to the execution apparatus. Alternatively, the management apparatus directly sends the first control instruction to the material apparatus and directly sends the second control instruction to the execution apparatus. In a process in which the material apparatus and the execution apparatus complete the maintenance task, the first controller and the second controller need to interact with each other, to cooperate with each other to complete the maintenance task. For example, after the material apparatus determines a position at which a to-be-assembled part is placed, the first controller sends a signal to the second controller, and then the second controller controls the robot media handler to grip the to-be-assembled part.

Next, the method for automatically assembling a device provided in this application is further separately explained by using examples in which operation types are part installation, part removal, and part replacement.

Embodiment 1

When the operation type is part installation, the management apparatus receives a maintenance task. The maintenance task includes the operation type, namely, part installation, and an operation object, namely, a number of a to-be-adjusted device and a model of a to-be-assembled part. The management apparatus parses the maintenance task into a task flow based on the operation type and the operation object, to generate a first control instruction and a second control instruction; and sends the first control instruction to the material apparatus and sends the second control instruction to the execution apparatus. The material apparatus calculates a position and a code of the to-be-assembled part based on the model of the to-be-assembled part in the first control instruction. Then, the execution apparatus installs the to-be-assembled part to the to-be-adjusted device according to the second control instruction.

Embodiment 2

When the task operation is part removal, the management apparatus receives a maintenance task. The maintenance task includes the operation type, namely, part removal, and an operation object, namely, a number of a to-be-adjusted device and a model of a to-be-removed part. The management apparatus parses the maintenance task into a task flow based on the operation type and the number of the to-be-adjusted device, to generate a first control instruction and a second control instruction; and sends the first control instruction to the material apparatus and sends the second control instruction to the execution apparatus. The execution apparatus determines the to-be-adjusted device through searching and removes the to-be-removed part from the to-be-adjusted device according to the second control instruction. The material apparatus determines an accommodation area in which the to-be-removed part can be placed, transports the to-be-removed part to the accommodation area, and records a position and a code of the to-be-removed part according to the first control instruction.

Embodiment 3

When a operation type is part replacement, the management apparatus receives a maintenance task. The maintenance task includes the operation type, namely, part replacement, and an operation object, namely, a number of a to-be-adjusted device, a model of a to-be-removed part, and a model of a to-be-assembled part. The management apparatus parses the maintenance task into a task flow based on the operation type and the number of the to-be-adjusted device, to generate a first control instruction and a second control instruction; and sends the first control instruction to the material apparatus and sends the second control instruction to the execution apparatus. The material apparatus calculates a position and a code of the to-be-assembled part based on the model of the to-be-assembled part in the first control instruction. The execution apparatus determines the to-be-adjusted device through searching and removes the to-be-removed part from the to-be-adjusted device according to the second control instruction; and then, the execution apparatus installs the to-be-assembled part to the to-be-adjusted device according to the second control instruction. Then, the material apparatus determines an accommodation area in which the to-be-removed part can be placed, transports the to-be-removed part to the accommodation area, and records a position and a code of the to-be-removed part according to the first control instruction.

The material apparatus in this embodiment of this application is further configured to: if a preset condition is met, adjust a position of a slot of a to-be-assembled part in a shelf, or adjust a type of a to-be-assembled part placed in a slot. Specifically, when a use frequency of a part of a type reaches a first threshold, the material apparatus may consider, based on historical data, that the use frequency of the part of the type is relatively high, and place the part of the type in a slot that is in the shelf and from which a part is relatively easy to be gripped, thereby improving working efficiency of the material apparatus. The use frequency is a quantity of times of using the part of the type in first time. The first threshold may be manually set based on experience, or may be obtained by the system through calculation based on historical data. The adjustment action may be performed when the system is idle without occupying device maintenance time. In an adjustment process, a to-be-assembled material may be transported by using a transport component, and a vacant slot may be used as an intermediate platform. First, a first part that has been placed in a slot in which a to-be-assembled part needs to be changed is removed from the slot and is placed in the vacant slot. Then, a second part that needs to be placed in the slot in which a to-be-assembled part needs to be changed is placed in the slot. For the first part placed in the vacant slot, the first part may be placed in a slot in which the second part is originally placed, or an operation of storing the first part may be determined based on a use frequency of the first part. A type of the to-be-assembled part includes a processor, a memory module, a network adapter, or a hard disk.

The following enumerates specific embodiments as references, and describes the technical solutions of this application by using an example in which a device assembling system replaces a memory module of a server. That is, an operation type is part replacement, and an operation object is specifically as follows: A number of a to-be-adjusted device is a server xxxxxx, a model of a to-be-removed memory module is a 16G memory module, and a model of a to-be-assembled part is a 32G memory module. In this embodiment, the device assembling system shown in FIG. 2 is used as an example. The execution apparatus 200 includes two robot media handlers 220: a first robot media handler 223 and a second robot media handler 224, and further includes tool handler storage racks 240 in a one-to-one correspondence with the two robot media handlers 220. The tool handler storage rack 240 is configured to store various tool handlers 222. The tool handler storage rack 240 includes a first drive structure that drives the tool handler storage rack 240 to rotate. As shown in FIG. 6, a memory module tool handler includes a first gripper 2224 and a second gripper 2225. The first gripper 2224 is configured to grip a memory module, and the second gripper 2225 is configured to open a lock for fastening the memory module. There is an air director outside a memory module that needs to be replaced, that is, the air director is a shield. Before the memory module is removed, the air director needs to be first removed. The tool handler storage rack 240 further stores an air director tool handler. A specific procedure in which the device assembling system replaces a memory module of a server includes the following steps.

Step S201: The management apparatus 300 obtains a maintenance task of the operation and maintenance system, and parses the maintenance task into a first control instruction and a second control instruction, where the maintenance task includes a part replacement task, and the part replacement task is specifically a task of replacing the 16G memory module of the server xxxxxx with the 32G memory module.

Step S202: The management apparatus 300 sends the first control instruction to the first controller 180 of the material apparatus 100, and sends the second control instruction to the second controller 250 of the execution apparatus 200.

Step S203: The first controller 180 determines a slot of a memory module (the 32G memory module) that needs to be used this time in the shelf 110 and a code of the memory module according to the first control instruction, and the first controller 180 controls the transport component 130 to take out, from the slot, a material tray 150 on which the memory module is placed and transport the material tray 150 to the material table 120. Specifically, codes of memory modules of various models and information about positions of the memory modules in the shelf 110 are all stored in the database. After receiving the first control instruction, the first controller 180 may read the slot of the memory module that needs to be used in the shelf 110 and the code of the memory module from the database.

Step S204: The first controller 180 further controls the transport component 130 to transport a vacant material tray 150 to the material transfer table 140.

Step S205: The first controller 180 sends, to the second controller 250 of the execution apparatus 200, information that the material apparatus completes an operation.

Step S206: The second controller 250 controls the operating table 210 of the execution apparatus 200 to fasten and clamp the server. Specifically, the server may be manually transported to the operating table 210, or the server may be transported to the operating table 210 by using a robot. This is not limited in this application.

(Optional) Step S207: The second controller 250 controls the first robot media handler 223 to remove an air director: The second controller 250 controls a tool handler storage rack 240 corresponding to the first robot media handler 223 to rotate, to enable an air director tool handler to be located at a preset position, and a robot arm 221 of the first robot media handler 223 selects the air director tool handler from the tool handler storage rack 240 and installs the air director tool handler to the robot arm 221; and the first controller 180 determines coordinates of a position of the air director by using a positioning component 225 of the first robot media handler 223, and then the first controller 180 controls the air director tool handler of the first robot media handler 223 to grip the air director, to remove the air director from the server and place the air director in a specified area.

Step S208: The second controller 250 controls the first robot media handler 223 or the second robot media handler 224 to determine coordinates of a card slot of the to-be-replaced memory module through positioning by using a positioning component: After removal of the air director is completed, after laying down the air director, the first robot media handler 223 may move to an area that is in the server and in which the memory module needs to replaced, and determine the coordinates of the card slot of the to-be-replaced memory module through positioning by using the positioning component 225 of the first robot media handler 223; or the second robot media handler 224 moves to the area that is in the server and in which the memory module needs to replaced, and determines the coordinates of the card slot of the to-be-replaced memory module through positioning by using a positioning component 225 of the second robot media handler 224.

(Optional) Step S209: The second controller 250 controls the first robot media handler 223 to replace the air director tool handler with a memory module tool handler: The second controller 250 controls the tool handler storage rack 240 corresponding to the first robot media handler 223 to rotate, to rotate an accommodation area for accommodating the air director tool handler to a preset position, and the first robot media handler 223 moves to the preset position to place the air director tool handler in the accommodation area of the air director tool handler; and then the second controller 250 controls a first drive structure to drive the tool handler storage rack 240 to rotate, to enable the memory module tool handler to be located at a preset position, and the robot arm 221 of the first robot media handler 223 moves to the preset position to install the memory module tool handler to the robot arm 221.

In a specific embodiment, coordinates of the foregoing preset positions and coordinates of accommodation areas of tool handlers of the tool handler storage rack 240 may be stored in the second controller 250. The second controller 250 only needs to control the tool handler storage rack 240 to rotate, to enable an accommodation area of a tool handler that needs to be used to move to a position of coordinates of a preset position.

To implement the foregoing process in which the robot arm installs or removes a tool handler, in a possible embodiment, when the second controller 250 controls the robot arm 221 to move to a position corresponding to coordinates of a preset position, the robot arm 221 may install or remove the tool handler.

In another possible embodiment, the positioning component 225 of the robot media handler 220 may be used to determine specific positions of a tool handler and an accommodation area in the tool handler storage rack 240 through positioning. Specifically, the robot arm 221 may be moved to an area near the tool handler storage rack 240. The second controller 250 determines coordinates of a tool handler that needs to be used or a tool handler accommodation area through positioning by using the positioning component 225, and then the second controller 250 controls the robot arm to move to the tool handler storage rack to install or remove the tool handler.

It should be noted that, alternatively, no air director may be disposed outside the memory module. In this case, the foregoing step S207 and step S209 and the following step 2017 and step 2018 are optional steps.

Step S2010: The second controller 250 controls the second robot media handler 224 to install a memory module tool handler: The second controller 250 controls a tool handler storage rack 240 corresponding to the second robot media handler to rotate, to enable the memory module tool handler to be located at a preset position, and a robot arm 221 of the second robot media handler 224 moves to the preset position to install the memory module tool handler to the robot arm 221.

Step S2011: The second controller 250 controls the second robot media handler 224 to grip the memory module that is on the material tray 150 and that needs to be used: The second robot media handler 224 moves to the material table 120, and determines coordinates of a memory module slot in the material tray 150 through positioning by using the positioning component 225, and a first gripper 2224 of the second robot media handler 224 grips the to-be-installed memory module (the 32G memory module) from the material tray 150. Step S2011 and step S2010 may be simultaneously performed.

Step S2012: The second controller 250 controls the first robot media handler 223 to remove, from the server, the memory module that needs to be removed: The first robot media handler 223 may move to an area of the card slot that is in the server and in which the memory module is to be replaced, and a second gripper 2225 of the first robot media handler 223 opens a lock; the first robot media handler 223 adjusts a position, and a first gripper 2224 of the first robot media handler 223 grips the memory module (the 16G memory module) that needs to be removed and pulls the memory module out of the card slot; and the first robot media handler 223 adjusts a posture to wait for the second robot media handler 224 to act, to prevent the first robot media handler 223 from interfering with the second robot media handler 224.

Step S2013: The second controller 250 controls the second robot media handler 224 to grip the to-be-installed memory module to the recognizer for verification: The second robot media handler 224 grips the to-be-installed memory module and moves to the recognizer 230, the recognizer 230 obtains information about the memory module after scanning an identifier of the memory module, and the second controller 250 obtains the information about the memory module, and performs verification on the information about the memory module and a model of a to-be-assembled part in a control instruction.

Step S2014: The second controller 250 controls the second robot media handler 224 to install the to-be-installed memory module to the server: After determining that a code of the memory module matches a code of the to-be-assembled part in the control instruction, the second controller 250 controls the second robot media handler 224 to move to an area that is in the server and in which the memory module needs to be installed; and determines, through positioning by using the positioning component 225, the coordinates of the card slot in which the memory module is to be replaced, and then inserts the memory module, where the lock automatically closes after the memory module is inserted in place, to complete installation of the memory module; and the second robot media handler 224 adjusts a posture to wait for the first robot media handler 223 to act, to prevent the first robot media handler 223 from interfering with the second robot media handler 224.

Step S2015: The second controller 250 controls the first robot media handler to grip the removed memory module to the recognizer for verification: The first robot media handler 223 grips the removed memory module and moves to the recognizer 230, and the recognizer 230 scans an identifier of the memory module (the 16G memory module) to obtain information about the memory module; and the second controller 250 obtains the information about the memory module, and performs verification on the information about the memory module and a model of a removed part in the control instruction.

Step s2016: The second controller 250 controls the first robot media handler 223 to place the removed memory module on the material tray 150 of the material transfer table 140: After the second controller 250 determines that the information about the removed memory module gripped by the first robot media handler 223 matches the model of the removed part in the control instruction, the second controller 250 controls the first robot media handler 223 to move to the material transfer table 140; and positions, by using the positioning component 225, coordinates of a slot of the material tray 150, and then places the memory module in the slot of the material tray 150.

(Optional) Step S2017: The second controller 250 controls the first robot media handler 223 to replace the memory module tool handler with the air director tool handler: The second controller 250 controls the tool handler storage rack 240 corresponding to the first robot media handler 223 to rotate, to rotate an accommodation area for storing the memory module tool handler to a preset position, and the first robot media handler 223 moves to the preset position to place the memory module tool handler in the accommodation area of the memory module tool handler; and then the second controller 250 controls the tool handler storage rack 240 to rotate, to enable the air director tool handler to be located at a preset position, and the robot arm 221 of the first robot media handler 223 moves to the preset position, to select the air director tool handler from the tool handler storage rack 240 and install the air director tool handler to the robot arm 221.

(Optional) Step S2018: The second controller 250 controls the first robot media handler 223 to grip an air director and install the air director to the server: The first robot media handler 223 moves to an area in which the air director is stored and determines coordinates of the air director through positioning by using the positioning component 225, and the air director tool handler of the first robot media handler 223 grips the air director and moves to a position that is in the server and at which the air director is to be installed; and then the first robot media handler 223 determines, through positioning by using the positioning component 225, coordinates of an area in which the air director is to be installed, and the first robot media handler 223 installs the air director to the server, to complete modification of one part of the server.

Step S2019: The second controller 250 sends, to the first controller 180 of the material apparatus 100, information that the execution apparatus 200 completes an operation.

Step S2020: The first controller 180 controls the transport component 130 to transport the removed memory module on the material transfer table 140 to a specified slot in the shelf 110: The first controller 180 controls the transport component 130 to transport the removed memory module placed on the material transfer table 140 to the specified slot in the shelf 110.

Step S2021: The first controller 180 and the second controller 250 feed back the operation steps, the code of the installed memory module, and the code of the removed memory module to the management apparatus 300 as feedback information.

Step S2022: The management apparatus 300 feeds back the feedback information to the operation and maintenance system, and the operation and maintenance system updates the database.

In the foregoing embodiment, the first robot media handler 223 and the second robot media handler 224 can simultaneously act without interference, to improve efficiency. In addition, some operations may be completed by either of the first robot media handler and the second robot media handler 224. Therefore, only one of the robot media handlers may be selected based on an actual workflow and action paths of the robot media handlers, to complete the operations.

In addition, in actual application, the execution apparatus may alternatively include more than two robot media handlers, an action path of each robot media handler is properly planned, and a specific action of each robot media handler may be planned based on an actual case. Alternatively, the execution apparatus may include one robot media handler. The robot media handler may first remove an air director, then remove a memory module, then install a memory module, and then install an air director, to complete modification of the memory module of the server.

In another embodiment, the device assembling system in the technical solutions of this application may be alternatively configured to replace a hard disk of a server. Usually, the hard disk has a handle bar. When the hard disk is installed to the server, the hard disk can be locked onto the server by fastening a lock of the handle bar. Therefore, the robot media handler of the device assembling system needs to be able to unlock and lock the handle bar, and further needs to be able to pull the hard disk out of the server. For this purpose, a hard disk tool handler may include two grippers, and the two grippers are a third gripper and a fourth gripper. In a specific embodiment, the third gripper may be a hook and is configured to unlock and lock the handle bar of the hard disk, and the fourth gripper is configured to grip the hard disk. The third gripper may be located on a side of the fourth gripper. Because a process of replacing a hard disk is relatively similar to the process of replacing a memory module, the following briefly describes a process in which the execution apparatus replaces a hard disk by using an example in which the device assembling system has two robot media handlers.

The management apparatus obtains a maintenance task of the operation and maintenance system; parses the maintenance task into a first control instruction and a second control instruction; and transmits the first control instruction to the first controller of the material apparatus and transmits the second control instruction to the second controller of the execution apparatus. The material apparatus places a to-be-installed hard disk on the material table and places a vacant material tray on the material transfer table according to the first control instruction. In the execution apparatus, according to the second control instruction, a first robot media handler and a second robot media handler separately install hard disk tool handlers; and the first robot media handler moves to a server, and after determining coordinates of a hard disk through positioning by using a positioning component, the first robot media handler first unlocks a handle bar by using a third gripper, and then extends into a gap between the handle bar and the hard disk by using the third gripper, to pull and expand the handle bar. Specifically, the handle bar can be expanded to an extreme position. The third gripper continues to pull the handle bar to clamp the hard disk and pull out the hard disk by a specified length, to enable the hard disk to be partially located outside a slot of the hard disk, so that a fourth gripper grips the hard disk. Then, the first robot media handler adjusts a posture, and clamps the hard disk by using the fourth gripper, and continues to pull out the hard disk. After the fourth gripper pulls out the hard disk by a specific length, a main portion of the hard disk may be clamped by using the second robot media handler, to prevent the hard disk from falling, thereby improving reliability of a hard disk removal process. In this case, the first robot media handler may release the hard disk and move to the material tray, and determine coordinates of a slot in the material tray through positioning by using the positioning component. Then, the first robot media handler clamps the hard disk to take out the hard disk, places the hard disk on the material tray of the material transfer table of the material apparatus after determining, by scanning an identifier by using the recognizer, that the hard disk is correct, and locks the handle bar. Then, the second robot media handler moves to the material table, determines coordinates of a slot in a material tray through positioning by using a positioning component, unlocks a handle bar by using a third gripper, takes out the to-be-assembled hard disk from the material tray by using a fourth gripper, and clamps the to-be-assembled hard disk. After determining, by scanning an identifier by using the recognizer, that the hard disk is correct, the first robot media handler clamps the to-be-assembled hard disk to an area that is in the server and in which the hard disk is installed, and the positioning component of the first robot media handler determines, through positioning, coordinates of the card slot in which the hard disk is to be installed. Then, the fourth gripper of the first robot media handler inserts the hard disk into the card slot, and pushes the hard disk into the card slot by using the third gripper. Then, the third gripper locks the handle bar, to complete installation of the hard disk.

In another embodiment, the device assembling system in the technical solutions of this application may be alternatively configured to replace a CPU of a server, and is specifically configured to replace a removable CPU of the server. The CPU may be a CPU of an independent module, or may be a CPU component into which a CPU and a heat sink are integrated. When the CPU and the heat sink are an integral CPU component, a screw between the heat sink and a housing of the server needs to be first unlocked, and then the CPU component is removed from a card slot of the server. In this case, a screw driving tool handler needs to be used. A process in which the execution apparatus replaces a CPU component into which a CPU and a heat sink are integrated is briefly described by using an example in which one robot media handler performs an operation.

The management apparatus obtains a maintenance task of the operation and maintenance system; parses the maintenance task into a first control instruction and a second control instruction; and transmits the first control instruction to the first controller of the material apparatus and transmits the second control instruction to the second controller of the execution apparatus. The material apparatus places a to-be-installed CPU component on the material table and places a vacant material tray on the material transfer table according to the first control instruction. In the execution apparatus, according to the second control instruction, a first robot media handler installs a screw driving tool handler, determines coordinates of a position of a screw between a heat sink and a server through positioning by using a positioning component, and unlocks the screw between the heat sink and the server by using the screw driving tool handler; then, the first robot media handler replaces the screw driving tool handler with a CPU tool handler, and the first robot media handler determines coordinates of a position of a CPU component through positioning by using the positioning component; and then, the CPU tool handler grips the CPU component to take out the CPU component, and then places the CPU component on the material tray of the material transfer table after determining, by scanning an identifier by using the recognizer, that the CPU component is correct. The first robot media handler replaces the screw driving tool handler with the CPU tool handler, takes out the to-be-assembled CPU component from a material tray of the material table by using the CPU tool handler, and clamps the to-be-assembled CPU component. After determining, by scanning an identifier by using the recognizer, that the CPU component is correct, the first robot media handler determines, through positioning by using the positioning component, coordinates of a slot that is in the server and in which the CPU component is to be installed, and the CPU tool handler inserts the CPU component into the card slot. The first robot media handler adjusts a posture, and replaces the CPU tool handler with the screw driving tool handler. Then, the first robot media handler determines coordinates of a position of a screw between a heat sink and the server through positioning by using the positioning component, and then tightens the screw between the heat sink and the server by using the screw driving tool handler, to complete installation of the CPU component.

Figure 11:
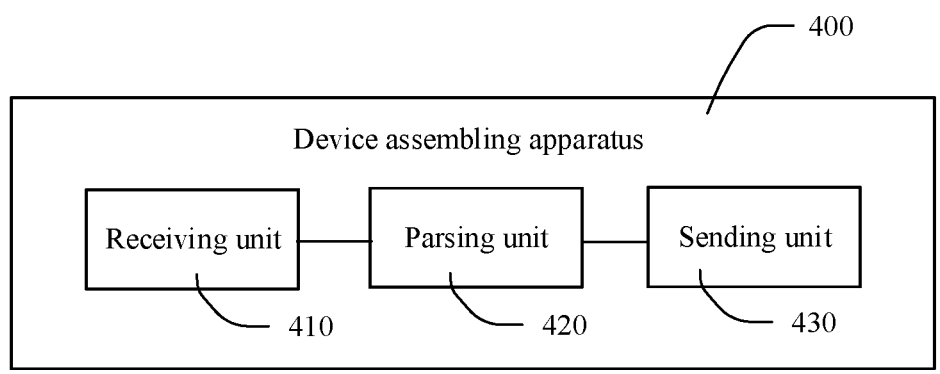
FIG. 11 is a schematic diagram of a structure of an apparatus for automatically assembling a device according to an embodiment of this application.

Based on a same inventive concept, this application further provides a device assembling apparatus 400. FIG. 11 is a schematic diagram of a structure of an apparatus for automatically assembling a device according to an embodiment of this application. As shown in the figure, the device assembling apparatus 400 includes a receiving unit 410, a parsing unit 420, and a sending unit 430. The receiving unit 410 is configured to receive a maintenance task, where the maintenance task includes an operation type and an operation object. The parsing unit 420 is configured to parse the maintenance task into a first control instruction and a second control instruction based on the operation type and the operation object. The sending unit 430 is configured to separately send the first control instruction and the second control instruction to a material apparatus and an execution apparatus, to instruct the material apparatus and the execution apparatus to complete an assembling operation of a to-be-assembled part in the device.

The apparatus 400 may correspondingly perform the method described in the embodiments of this application. In addition, the foregoing and other operations and/or functions of the units in the apparatus 400 are separately used to implement corresponding procedures of the methods in FIG. 9, FIG. 10A, FIG. 10B, and FIG. 10C. For brevity, details are not described herein again.

In this solution, the device assembling apparatus is used to assemble a part of a device, to implement automatic assembling of a server to replace a manual operation, thereby helping improve efficiency. In addition, assembling log information, material information, and the like may be uploaded to a management apparatus through communication between a first controller and a second controller and the management apparatus, to ensure real-time updating and accuracy of material information of the server. Specifically, the log information is an operating status, time, alarm information, and the like of each step.

This application further provides a device assembling system. The system includes a management apparatus, a material apparatus, and an execution apparatus. Specific structures of the management apparatus, the material apparatus, and the execution apparatus include any possible logical architecture in FIG. 1 to FIG. 3 and an extended architecture thereof, and are configured to implement functions of the foregoing structures. For brevity, details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A device assembling system, comprising:
   a management apparatus;
   a material apparatus; and
   an execution apparatus,
   wherein the management apparatus is configured to: obtain a maintenance task, wherein the maintenance task comprises an operation type and an operation object, and parse the maintenance task into a first control instruction and a second control instruction based on the operation type and the operation object;
   wherein the material apparatus comprises a first controller, a shelf, a material table, a material tray, and a transport component, wherein a to-be-assembled part is placed in the shelf;
   wherein the shelf comprises a plurality of slots, the to-be-assembled part is accommodated in a first slot of the plurality of slots, a positioning structure is disposed in each slot of the plurality of slots, and the positioning structure is adapted to the transport component, so that the transport component grips the to-be-assembled part in the first slot based on the positioning structure;
   wherein the material tray is configured to be accommodated in the first slot, and the to-be-assembled part is accommodated in the material tray;
   wherein the material apparatus is configured to receive the first control instruction;
   wherein the first controller is communicatively connected to the management apparatus and is configured to: determine a position of the to-be-assembled part in the shelf according to the first control instruction, and control the transport component to transport the to-be-assembled part to the material table; and
   wherein the execution apparatus is configured to receive the second control instruction, obtain the to-be-assembled part in the material apparatus according to the second control instruction, and assemble the to-be-assembled part to a device.

2. The device assembling system according to claim 1, wherein the management apparatus is communicatively connected to the material apparatus and the execution apparatus, respectively; and
   wherein the material apparatus and the execution apparatus are assembled to form an overall structure.

3. The device assembling system according to claim 2, further comprising:
   a movable apparatus, wherein the movable apparatus is installed at bottom portions of the material apparatus and the execution apparatus for implementing position movement of the device assembling system.

4. The device assembling system according to claim 1, wherein the operation type comprises part installation, part replacement, or part removal.

5. The device assembling system according to claim 1, wherein the material apparatus further comprises a material inlet table and a material outlet table, and the material inlet table and the material outlet table are interconnected to a warehouse for material transmission.

6. The device assembling system according to claim 1, wherein the execution apparatus comprises a second controller and a robot media handler; and
wherein the second controller is communicatively connected to the management apparatus, and is configured to control, according to the second control instruction, the robot media handler to grip the to-be-assembled part located on the material table, and assemble the to-be-assembled part to the device.

7. The device assembling system according to claim 6, wherein the material apparatus further comprises a material transfer table; and
wherein the robot media handler places a removed part on the material transfer table or a scrap area based on control of the second controller, and the transport component of the material apparatus transports the removed part from the material transfer table to the shelf based on control of the first controller.

8. The device assembling system according to claim 1, wherein the material apparatus is further configured to:
based on a preset condition being met, adjust a type of a first to-be-assembled part placed in a slot of the material apparatus, wherein the type of the first to-be-assembled part comprises a processor, a memory, a network adapter, or a hard disk, and the preset condition comprises that a quantity of times of obtaining any type of to-be-assembled part within a first time period reaches a first threshold.

9. A device assembling method, comprising:
receiving, by a management apparatus, a maintenance task, wherein the maintenance task comprises an operation type and an operation object;
parsing, by the management apparatus, the maintenance task into a first control instruction and a second control instruction based on the operation type and the operation object; and
separately sending, by the management apparatus, the first control instruction and the second control instruction to a material apparatus and an execution apparatus, to instruct the material apparatus and the execution apparatus to complete an assembling operation of a to-be-assembled part in a device;
wherein based on the operation type being a removed part operation type, the execution apparatus is configured to determine a position of a to-be-removed part according to the second control instruction and to remove the to-be-removed part; and
wherein the material apparatus is configured to transport the to-be-removed part to an accommodation area according to the first control instruction and record the position and a code of the to-be-removed part.

10. The device assembling method according to claim 9, wherein the operation type comprises part installation, part replacement, or part removal.

11. The device assembling method according to claim 9, wherein the operation object comprises a number of a to-be-adjusted device, a model of a to-be-removed part, or a model of a to-be-assembled part.

12. The device assembling method according to claim 9, wherein the maintenance task further comprises a task type, and the task type comprises a scheduled task, an automatic task, or a manual task.

13. The device assembling method according to claim 9, wherein based on the operation type being a part installation operation type, the material apparatus searches for a to-be-assembled part according to the first control instruction, and the execution apparatus installs the to-be-assembled part to the device according to the second control instruction.

14. The device assembling method according to claim 9, wherein based on the operation type being a part replacement operation type, the execution apparatus determines a position of a to-be-removed part and removes the to-be-removed part according to the second control instruction, the material apparatus searches for a to-be-assembled part according to the first control instruction, and the execution apparatus installs the to-be-assembled part on the device according to the second control instruction.

15. The device assembling method according to claim 9, wherein the separately sending, by the management apparatus, the first control instruction and the second control instruction to a material apparatus and an execution apparatus comprises:
sending, by the management apparatus, the first control instruction and the second control instruction to the material apparatus, and sending, by the material apparatus, the second control instruction to the execution apparatus.

16. The device assembling method according to claim 9, wherein the material apparatus is further configured to:
based on a preset condition being met, adjust a type of a first to-be-assembled part placed in a slot of the material apparatus, wherein the type of the to-be-assembled part comprises a processor, a memory, a network adapter, or a hard disk, and the preset condition comprises that a quantity of times of obtaining any type of to-be-assembled part within a first time period reaches a first threshold.

17. A device assembling system, comprising:
a management apparatus;
a material apparatus; and
an execution apparatus,
wherein the management apparatus is configured to: obtain a maintenance task, wherein the maintenance task comprises an operation type and an operation object, and parse the maintenance task into a first control instruction and a second control instruction based on the operation type and the operation object;
wherein the material apparatus comprises a first controller, a shelf, a material table, a material transfer table, and a transport component, wherein a to-be-assembled part is placed in the shelf;
wherein the material apparatus is configured to receive the first control instruction;
wherein the first controller is communicatively connected to the management apparatus and is configured to: determine a position of the to-be-assembled part in the shelf according to the first control instruction, and control the transport component to transport the to-be-assembled part to the material table;
wherein the execution apparatus is configured to: receive the second control instruction, and obtain the to-be-assembled part in the material apparatus according to the second control instruction;
wherein the execution apparatus comprises a second controller and a robot media handler;
wherein the second controller is communicatively connected to the management apparatus, and is configured to control, according to the second control instruction, the robot media handler to grip the to-be-assembled part located on the material table, and assemble the to-be-assembled part to a device; and wherein the robot media handler of the execution apparatus places a removed part on the material transfer table based on control of the second controller, and the transport component of the material apparatus transports the removed part from the material transfer table to the shelf based on control of the first controller.

* * * * *